(12) United States Patent
Gokmen

(10) Patent No.: US 10,740,671 B2
(45) Date of Patent: *Aug. 11, 2020

(54) CONVOLUTIONAL NEURAL NETWORKS USING RESISTIVE PROCESSING UNIT ARRAY

(71) Applicant: INTERNATIONAL BUSINESS MACHINES CORPORATION, Armonk, NY (US)

(72) Inventor: Tayfun Gokmen, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 659 days.

This patent is subject to a terminal disclaimer.

(21) Appl. No.: 15/480,597

(22) Filed: Apr. 6, 2017

(65) Prior Publication Data
US 2018/0075338 A1 Mar. 15, 2018

Related U.S. Application Data

(63) Continuation of application No. 15/262,606, filed on Sep. 12, 2016, now Pat. No. 9,646,243.

(51) Int. Cl.
*G06N 3/063* (2006.01)
*G06N 3/04* (2006.01)
(Continued)

(52) U.S. Cl.
CPC ............ *G06N 3/04* (2013.01); *G06N 3/0454* (2013.01); *G06N 3/0635* (2013.01); *G06N 3/08* (2013.01); *G06N 3/06* (2013.01); *G06N 3/063* (2013.01)

(58) Field of Classification Search
None
See application file for complete search history.

(56) References Cited

U.S. PATENT DOCUMENTS

| 5,058,049 A | 10/1991 | Anderson |
| 7,302,513 B2 | 11/2007 | Mouttet |
| (Continued) | | |

FOREIGN PATENT DOCUMENTS

| JP | H05282272 A | 10/1993 |
| JP | H07121498 A | 5/1995 |
| (Continued) | | |

OTHER PUBLICATIONS

Alibart et al., "Pattern Classification by Memristive Crossbar Circuits using Ex Situ and in Situ Training", Nature Communications, Jun. 25, 2013, pp. 1-7.

(Continued)

*Primary Examiner* — Wilbert L Starks
(74) *Attorney, Agent, or Firm* — Cantor Colburn LLP; Vazken Alexanian

(57) ABSTRACT

Technical solutions are described for implementing a convolutional neural network (CNN) using resistive processing unit (RPU) array. An example method includes configuring an RPU array corresponding to a convolution layer in the CNN based on convolution kernels of the layer. The method further includes performing forward pass computations via the RPU array by transmitting voltage pulses corresponding to input data to the RPU array, and storing values corresponding to output currents from the RPU arrays as output maps. The method further includes performing backward pass computations via the RPU array by transmitting voltage pulses corresponding to error of the output maps, and storing the output currents from the RPU arrays as backward error maps. The method further includes performing update pass computations via the RPU array by transmitting voltage (Continued)

US 10,740,671 B2

Page 2 pulses corresponding to the input data of the convolution layer and the error of the output maps to the RPU array.

20 Claims, 31 Drawing Sheets

(51) Int. Cl.
*G06N 3/08* (2006.01)
*G06N 3/06* (2006.01)

(56) References Cited

U.S. PATENT DOCUMENTS

| | | | |
|---|---|---|---|
| 7,398,259 | B2 | 7/2008 | Nugent |
| 7,525,833 | B2 | 4/2009 | Snider et al. |
| 7,902,867 | B2 | 3/2011 | Mouttet |
| 8,391,049 | B2 | 3/2013 | Jo |
| 8,510,244 | B2 | 8/2013 | Carson et al. |
| 8,832,009 | B2 | 9/2014 | Rose et al. |
| 9,041,389 | B2 | 5/2015 | Gokmen et al. |
| 9,092,736 | B2 | 7/2015 | Aparin et al. |
| 9,203,022 | B2 | 12/2015 | Hopstaken et al. |
| 9,389,273 | B2 | 7/2016 | Gokmen et al. |
| 9,400,306 | B2 | 7/2016 | Gokmen et al. |
| 9,443,997 | B2 | 9/2016 | Gokmen et al. |
| 9,601,546 | B1 | 3/2017 | Ando et al. |
| 9,608,160 | B1 | 3/2017 | Bayram et al. |
| 9,646,243 | B1 * | 5/2017 | Gokmen ............... G06N 3/0635 |
| 9,659,249 | B1 | 5/2017 | Copel et al. |
| 9,715,656 | B1 | 6/2017 | Gokmen et al. |
| 9,779,355 | B1 | 10/2017 | Leobandung et al. |
| 9,852,790 | B1 | 12/2017 | Gokmen et al. |
| 9,887,351 | B1 | 2/2018 | Ando et al. |
| 9,997,704 | B2 | 6/2018 | Ando et al. |
| 10,079,341 | B1 | 9/2018 | Bedell et al. |
| 10,096,773 | B1 | 10/2018 | Ando et al. |
| 10,115,800 | B1 | 10/2018 | Kim et al. |
| 10,141,509 | B2 | 11/2018 | Ando et al. |
| 10,153,159 | B1 | 12/2018 | Kim et al. |
| 10,186,657 | B2 | 1/2019 | Brew et al. |
| 10,248,907 | B2 | 4/2019 | Gokmen |
| 10,373,051 | B2 | 8/2019 | Gokmen |
| 2008/0089110 | A1 | 4/2008 | Robinett et al. |
| 2011/0153533 | A1 | 6/2011 | Jackson et al. |
| 2014/0156576 | A1 | 6/2014 | Nugent |
| 2014/0172937 | A1 | 6/2014 | Linderman et al. |
| 2014/0215121 | A1 | 7/2014 | Ordentlich et al. |
| 2015/0036920 | A1 | 2/2015 | Wu et al. |
| 2015/0106314 | A1 | 4/2015 | Birdwell et al. |
| 2015/0170025 | A1 | 6/2015 | Wu et al. |
| 2015/0171868 | A1 | 6/2015 | Rodriguez et al. |
| 2015/0294219 | A1 | 10/2015 | Krizhevsky |
| 2015/0347897 | A1 | 12/2015 | Modha |
| 2015/0379395 | A1 | 12/2015 | Pickett |
| 2016/0049195 | A1 | 2/2016 | Yu et al. |
| 2016/0117587 | A1 | 4/2016 | Yan |
| 2016/0148078 | A1 | 5/2016 | Xiaohui et al. |
| 2016/0162782 | A1 | 6/2016 | Park |
| 2017/0109626 | A1 | 4/2017 | Gokmen et al. |
| 2017/0109628 | A1 | 4/2017 | Gokman et al. |
| 2018/0005110 | A1 | 1/2018 | Gokmen et al. |
| 2018/0075350 | A1 | 3/2018 | Gokmen |
| 2018/0089559 | A1 | 3/2018 | Copel et al. |

FOREIGN PATENT DOCUMENTS

| | | |
|---|---|---|
| JP | H07139507 A | 12/1995 |
| WO | 2016030230 A1 | 3/2016 |

OTHER PUBLICATIONS

Chippa et al., "StoRM: a stochastic recognition and mining processor," 2014 International Symposium on Low Power Electronics and Design, 2014, pp. 39-44.

Chua, "Resistance switching memories are memristors," Applied Physics A, vol. 102, No. 4, 2011, pp. 765-783.

Frontiers in neuroscience Acceleration of Deep Neural Network Training with Resistive Cross-Point Devices: DesignConsiderations Tayfun Gokmen and YuriiVlasov IBM T.J. WatsonResearchCenter,YorktownHeights,NY,USA Front. Neurosci., Jul. 21, 2016pp. 1-13.

Garbin et al., "Variability-tolerant Convolutional Neural Network for Pattern Recognition Applications based on OxRAM Synapses," IEEE, International Electron Devices Meeting, 2014, pp. 28.4.1-28.4.4.

Gokmen et al., Acceleration of Deep Neural Network Training with Resistive Cross-Point Devices: Design Considerations, Frontiers in Neuroscience, Jul. 21, 2016, pp. 1-13.

IEEE Xplore A CMOS Spiking Neuron for Brain-Inspired Neural Networks With Resistive Synapses and In Situ Learning Published in: IEEE Transactions on Circuits and Systems II: Express Briefs ( vol. 62 , Issue: 11 , Nov. 2015 ) Xinyu Wu; Vishal Saxena; Kehan Zhu; Sakkarapani Balagopa pp. 1088-1092 IEEE.

Lehmann et al., "A Generic Systolic Array Building Block for Neural Networks with On-Chip Learning," IEEE Transactions on Neural Networks, vol. 4, No. 3, 1993, pp. 400-407.

Li et al., "Training itself: Mixed-signal training acceleration for memristor-based neural network," 19th Asia and South Pacific Design Automation Conference (ASP-DAC), 2014, pp. 361-366.

List of IBM Patents or Patent Applications Treated As Related; Date Filed: Jan. 3, 2020, 2 pages.

NANO Letters Nanoscale Memristor Device as Synapse in Neuromorphic Systems Sung Hyun Jo, Ting Chang, Idongesit Ebong, Bhavitavya B. Bhadviya, Pinaki Mazumder, and Wei Lu, Nano Lett. 2010, 10, pp. 1297-1301.

Nature Communications Pattern classification by memristor crossbar circuits using ex situ and in situ Training Fabien Alibart, Elham Zamanidoost & Dmitri B. Strukov | Accepted May 29, 2013 | Published Jun. 25, 2013 pp. 1-7.

Pershin et al., "Solving mazes with memristors: A massively parallel approach," Physical Review E, vol. 84, No. 4, 2011, 046703, 6 pages.

ScienceDirect Elsevier Neurocomputing vol. 74, Issues 1-3, Dec. 2010, pp. 239-255 Artificial neural networks in hardware: A survey of two decades of progress Janardan Misra, Indranil Saha.

Soudry et al., "Memristor-Based Multilayer Neural Networks With Online Gradient Descent Training," IEEE Transactions on Neural Networks and Learning Systems, 2015.

Stutz, "Understanding Convolutional Neural Networks", Seminar Report, Aug. 30, 2014, pp. 1-23.

* cited by examiner f(x) = f (INPUT 1 * CONNECTION STRENGTH 1 + INPUT 2 * CONNECTION STRENGTH 2)

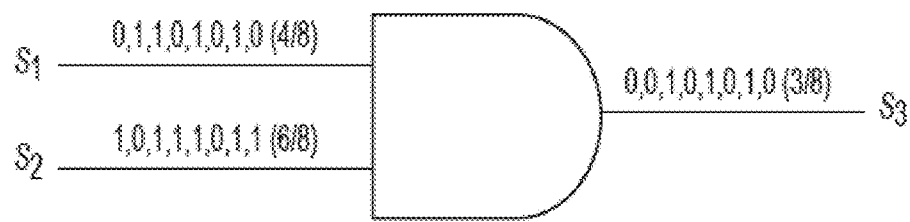
FIG. 7B
$$i = g(s,v)v \qquad \text{EQUATION [1]}$$
$$\frac{\partial s(t)}{\partial t} = f(s,v) \qquad \text{EQUATION [2]}$$
FIG. 7C
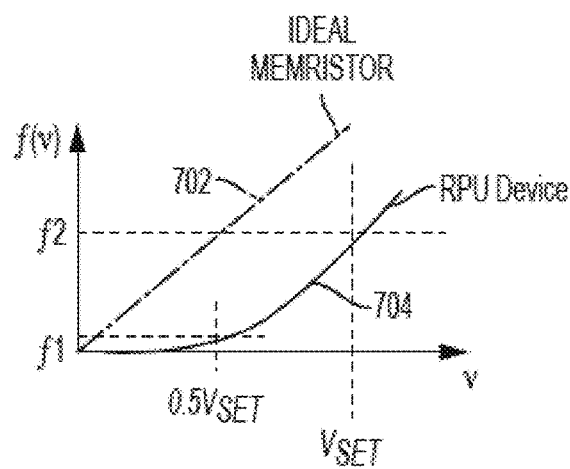
FIG. 7D

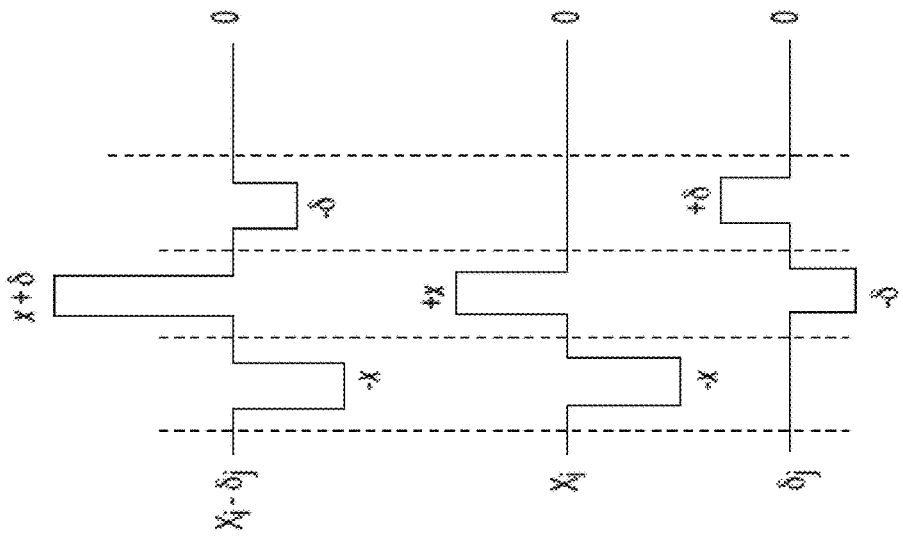
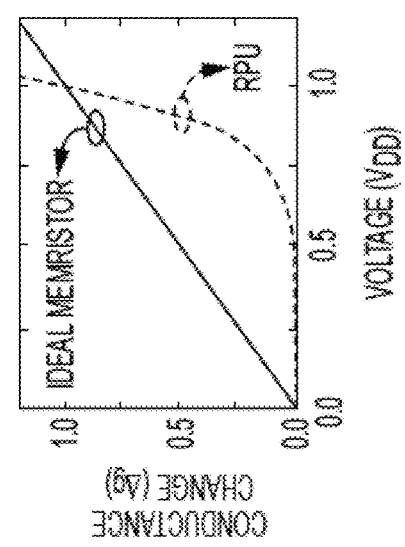
VOLTAGE HEIGHT MODULATION FOR LOCAL MULTIPLICATION
ASSUME $\Delta g \sim (e^V - 1)$
THEN $\Delta w \approx (e^{x+\delta} - 1) - (e^x - 1) - (e^\delta - 1)$
CAN BE ACHIEVED BY SENDING 3 PULSES WHERE HEIGHTS MODULATED DEPENDING ON $x$ AND $\delta$ VALUES AS SHOWN ON THE RIGHT
FIG. 14

VOLTAGE HEIGHT MODULATION FOR LOCAL MULTIPLICATION - CONTINUED

THE FIRST TWO TERMS OF THE TAYLOR EXPANSION GIVES THE FOLLOWING RESULTS

EXPONENTIAL FUNCTION:

$$e^x = \sum_{n=0}^{\infty} \frac{x^n}{n!} = 1 + x + \frac{x^2}{2!} + \frac{x^3}{3!} + \ldots \text{ FOR ALL } x$$

$$\Delta w = (e^{x+\delta} - 1)\cdot(e^x - 1)$$

$$\Delta w = (1 + (x+\delta) + \frac{(x+\delta)^2}{2} - 1) \cdot (1 + (x) + \frac{(x)^2}{2} - 1) \cdot (1 + (\delta) + \frac{(\delta)^2}{2} - 1)$$

$$\boxed{\Delta w = x\delta}$$

ABOVE EQUATION SIMPLIFIES TO

THIS DEMONSTRATES THAT THE HIGHER ORDER TERMS DO NOT MATTER, AND THE DISCLOSED UPDATE METHODOLOGIES WORK AS WELL AS THE PERFECT MULTIPLICATION CASE AS SHOWN ON THE DIAGRAM TO THE RIGHT

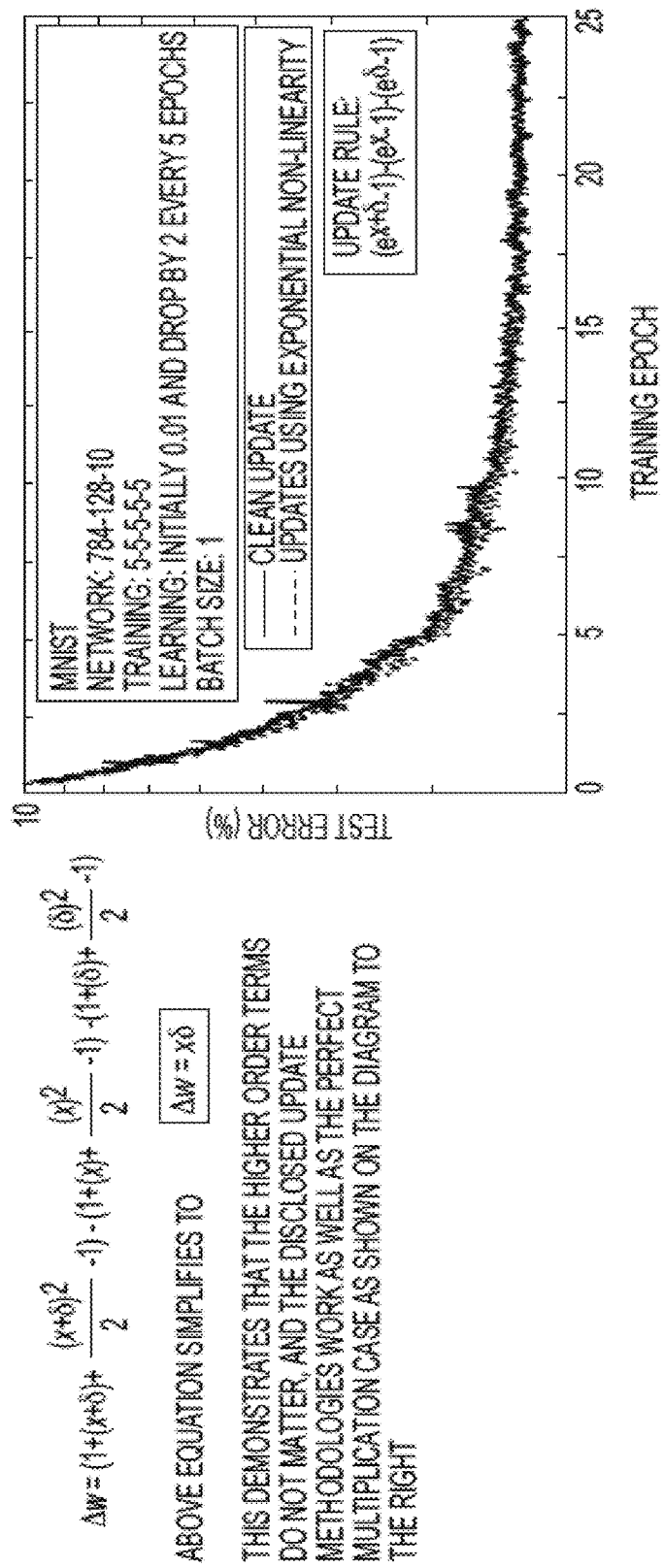

FIG. 15

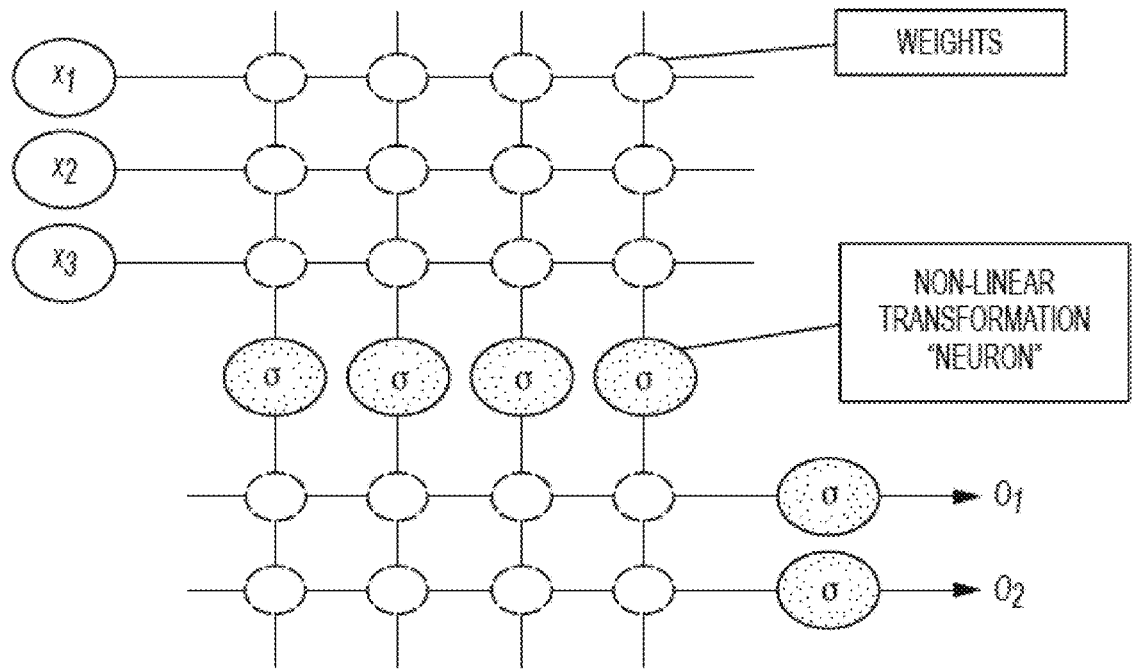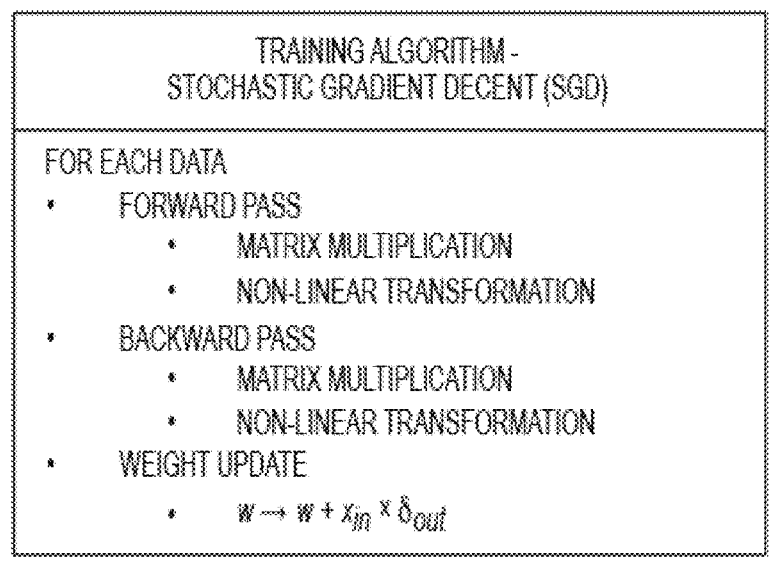
FIG. 16

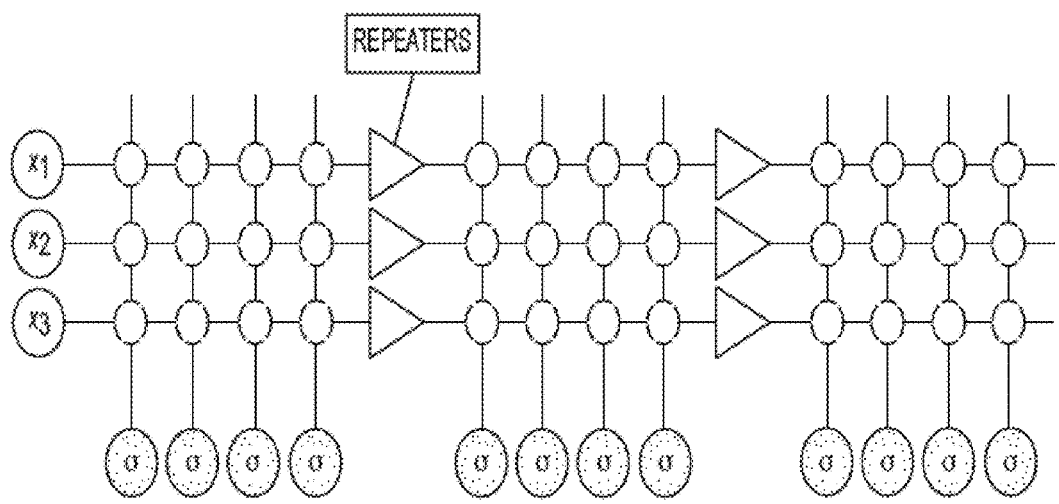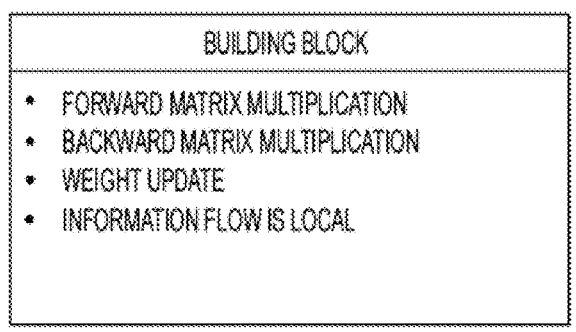
FIG. 17

Input Maps 510 * Convolution Kernels 520 => Output Maps 530

$$o_1 = r_1\alpha_1 + r_2\alpha_2 + r_5\alpha_3 + r_6\alpha_4$$
$$+ g_1\beta_1 + g_2\beta_2 + g_5\beta_3 + g_6\beta_4$$
$$+ b_1\gamma_1 + b_2\gamma_2 + b_5\gamma_3 + b_6\gamma_4$$

$$o_2 = r_2\alpha_1 + r_3\alpha_2 + r_6\alpha_3 + r_7\alpha_4$$
$$+ g_2\beta_1 + g_3\beta_2 + g_6\beta_3 + g_7\beta_4$$
$$+ b_2\gamma_1 + b_3\gamma_2 + b_6\gamma_3 + b_7\gamma_4$$

AlexNet CNN Example

CONVOLUTIONAL NEURAL NETWORKS USING RESISTIVE PROCESSING UNIT ARRAY

PRIORITY

This application is a continuation of U.S. Non-Provisional application Ser. No. 15/262,606, entitled "CONVOLUTIONAL NEURAL NETWORKS USING RESISTIVE PROCESSING UNIT ARRAY", filed Sep. 12, 2016, which is incorporated herein by reference in its entirety.

BACKGROUND

The present invention relates in general to novel configurations of trainable resistive crosspoint devices, which are referred to herein as resistive processing units (RPUs). More specifically, the present invention relates to artificial neural networks (ANNs) formed from crossbar arrays of two-terminal RPUs that provide local data storage and local data processing without the need for additional processing elements beyond the two-terminal RPU, thereby accelerating the ANN's ability to learn and implement algorithms such as online neural network training, matrix inversion, matrix decomposition and the like.

Technical problems such as character recognition and image recognition by a computer are known to be well handled by machine-learning techniques. "Machine learning" is used to broadly describe a primary function of electronic systems that learn from data. In machine learning and cognitive science, neural networks are a family of statistical learning models inspired by the biological neural networks of animals, and in particular the brain. Neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of a desired patterns, such as images and characters. Oftentimes, these neurons are grouped into "layers" in order to make connections between groups more obvious and to each computation of values. Training the neural network is a computationally intense process.

SUMMARY

According to one or more embodiments, a computer implemented method for implementing a convolutional neural network (CNN) using resistive processing unit (RPU) array includes configuring an RPU array corresponding to a convolution layer in the CNN based on convolution kernels of the convolution layer. The method further includes performing forward pass computations for the CNN via the RPU array by transmitting voltage pulses corresponding to input data of the convolution layer to the RPU array, and storing values corresponding to output currents from the RPU arrays as output maps. The method further includes performing backward pass computations for the CNN via the RPU array by transmitting voltage pulses corresponding to error of the output maps of the convolution layer to the RPU array, and storing values corresponding to the output currents from the RPU arrays as backward error maps. The method further includes performing update pass computations for the CNN via the RPU array by transmitting voltage pulses corresponding to the input data of the convolution layer and the error of the output maps to the RPU array.

According to one or more embodiments, a system facilitating training a convolution layer of a convolutional neural network (CNN) using resistive processing unit (RPU) arrays, includes an RPU array, which includes a plurality of RPUs, and a processor configured to control electric voltage across the RPUs from the RPU array. The processor configures the RPU array corresponding to the convolution layer based on dimensions associated with convolution kernels of the convolution layer. The processor performs forward pass computations for the CNN via the RPU array by transmitting voltage pulses corresponding to input data of the convolution layer to the RPU array, and storing values corresponding to output currents from the RPU arrays as output maps. The processor also performs backward pass computations for the CNN via the RPU array by transmitting voltage pulses corresponding to error of the output maps of the convolution layer to the RPU array, and storing values corresponding to the output currents from the RPU array as backward error maps. The processor also performs update pass computations for the CNN via the RPU array by transmitting voltage pulses corresponding to the input data of the convolution layer and the error of the output maps to the RPU array; and update weights of RPU devices of the RPU array.

According to one or more embodiments, a computer program product for training a convolution layer of a convolutional neural network (CNN) using resistive processing unit (RPU) arrays includes a computer readable storage medium. The computer readable storage medium includes computer executable instructions to configure an RPU array corresponding to the convolution layer based on dimensions associated with convolution kernels of the convolution layer. The computer readable storage medium includes computer executable instructions to perform forward pass computations for the CNN via the RPU array by transmitting voltage pulses corresponding to input data of the convolution layer to the RPU array, and storing values corresponding to output currents from the RPU arrays as output maps. The computer readable storage medium includes computer executable instructions to perform backward pass computations for the CNN via the RPU array by transmitting voltage pulses corresponding to error of the output maps of the convolution layer to the RPU array, and storing values corresponding to the output currents from the RPU array as backward error maps. The computer readable storage medium includes computer executable instructions to perform update pass computations for the CNN via the RPU array by transmitting voltage pulses corresponding to the input data of the convolution layer and the error of the output maps to the RPU array. The computer readable storage medium includes computer executable instructions to update weights of RPU devices from the RPU array.

BRIEF DESCRIPTION OF THE DRAWINGS

The examples described throughout the present document can be better understood with reference to the following drawings and description. The components in the figures are not necessarily to scale. Moreover, in the figures, like-referenced numerals designate corresponding parts throughout the different views.

FIG. 7B depicts a simplified block diagram of a stochastic computing methodology capable of being used in one or more embodiments;

FIG. 7C depicts known equations that govern the operation of a passive, two-terminal memristor;

FIG. 7D depicts a graphical comparison between the linear switching characteristic of a known two-terminal memristor and the non-linear switching characteristic of a two-terminal RPU of the present invention;

FIG. 14 depicts graphs, diagrams and equations illustrating a height-modulation weight update methodology using a two-terminal RPU having an exponential non-linearity according to one or more embodiments;

FIG. 15 depicts graphs and equations further illustrating a height-modulation weight update methodology using a two-terminal, non-linear RPU according to one or more embodiments;

FIG. 16 depicts aspects of developing, training and using an ANN architecture that includes crossbar arrays of two-terminal, non-liner RPUs according to the present invention;

FIG. 17 depicts additional aspects of developing, training and using an ANN architecture that includes crossbar arrays of two-terminal, non-liner RPUs according to the present invention;

FIG. 22 illustrates an example of CNN;

FIG. 28 further illustrates the computations for the update pass for the example CNN layer from FIG. 27;

DETAILED DESCRIPTION

Figure 1:
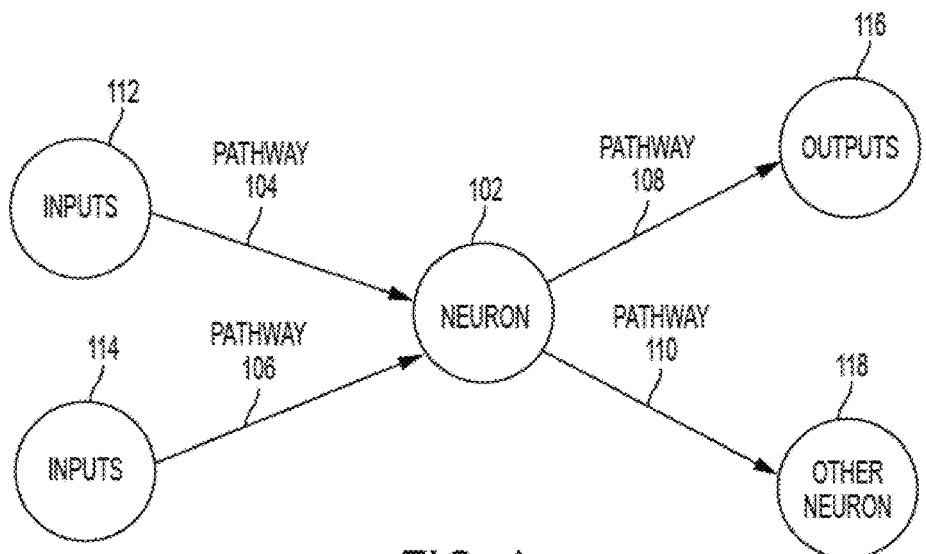
FIG. 1 depicts a simplified diagram of input and output connections of a biological neuron.

Described herein are technical solutions for accelerating training of convolutional neural networks. The technical solutions include using RPUs, such as those configured in an RPU array for training convolutional neural networks. The RPU array can be a crosspoint arrays. As such the technical solutions are rooted in and/or tied to computer technology in order to overcome a problem specifically arising in the realm of computers, specifically training convolutional neural networks.

The technical solutions described herein facilitate gain in efficiencies of deep learning techniques that use convolutional neural networks. Deep learning techniques are widely used in machine-based pattern recognition problems, such as image and speech recognition. Deep learning inherently leverages the availability of massive training datasets (that are enhanced with the use of Big Data) and compute power (that is expected to grow according to Moore's Law).

It is understood in advance that although one or more embodiments are described in the context of biological neural networks with a specific emphasis on modeling brain structures and functions, implementation of the teachings recited herein are not limited to modeling a particular environment. Rather, embodiments of the present invention are capable of modeling any type of environment, including for example, weather patterns, arbitrary data collected from the internet, and the like, as long as the various inputs to the environment can be turned into a vector.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays, cross-wire arrays, or RPU arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications.

Although the present invention is directed to an electronic system, for ease of reference and explanation various aspects of the described electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
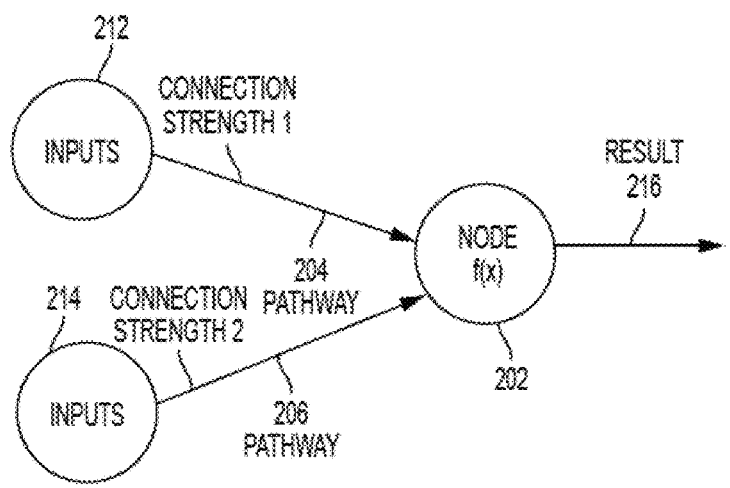
FIG. 2 depicts a simplified model of the biological neuron shown in FIG. 1.
Figure 3:
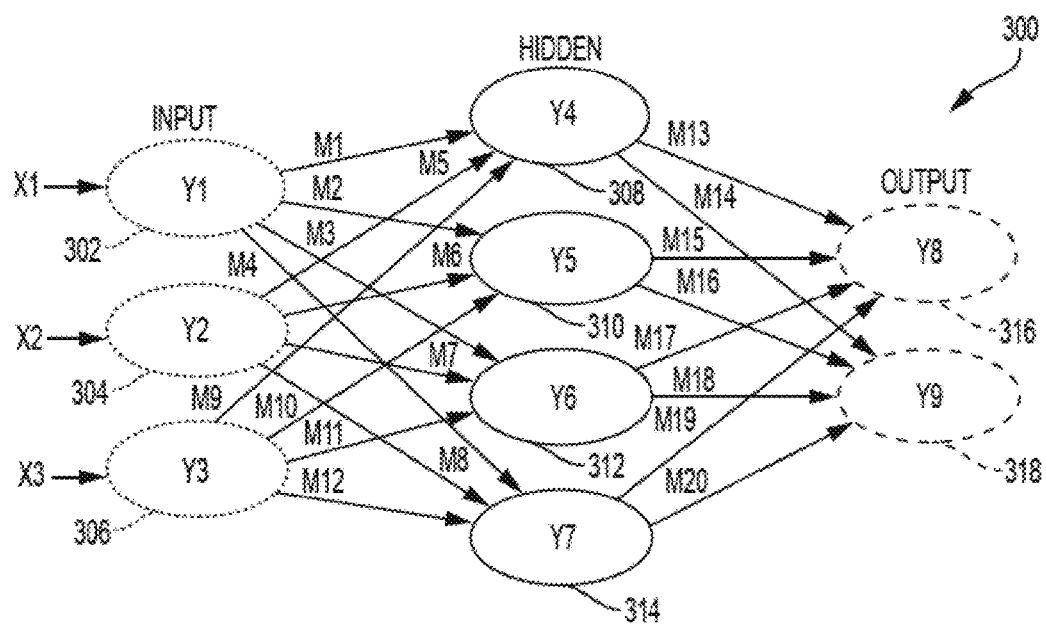
FIG. 3 depicts a simplified model of an ANN incorporating the biological neuron model shown in FIG. 2.

As background, a general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream outputs 116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which can be a final output or an input to another node, or both. In the present description, an asterisk (*) is used to represent a multiplication, which can be a matrix multiplication. For example, the matrix multiplication can be used to perform convolution operations between input data and one or more convolution kernels to generate output maps. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers can be provided.

Similar to the functionality of a human brain, each input layer node 302, 304, 306 of ANN 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. In one or more examples, the multiplication can be a matrix multiplication used to perform a convolution operation. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it can become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm can be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire description of which is incorporated by reference herein.

The use of neural networks, particularly with convolutional layers, has driven progress in deep learning. Such neural networks are referred to as convolutional neural networks (CNN). In a CNN, kernels convolute overlapping regions in a visual field, and accordingly emphasize the importance of spatial locality in feature detection. Computing the convolutional layers of the CNN, typically, encompasses more than 90% of computation time in neural network training and inference. The training for example, depending on the size of the training dataset that is being used, can be a week or longer. Thus, accelerating the CNN training, as described by the examples of the technical solutions herein, is a desirable improvement.

Figure 4:
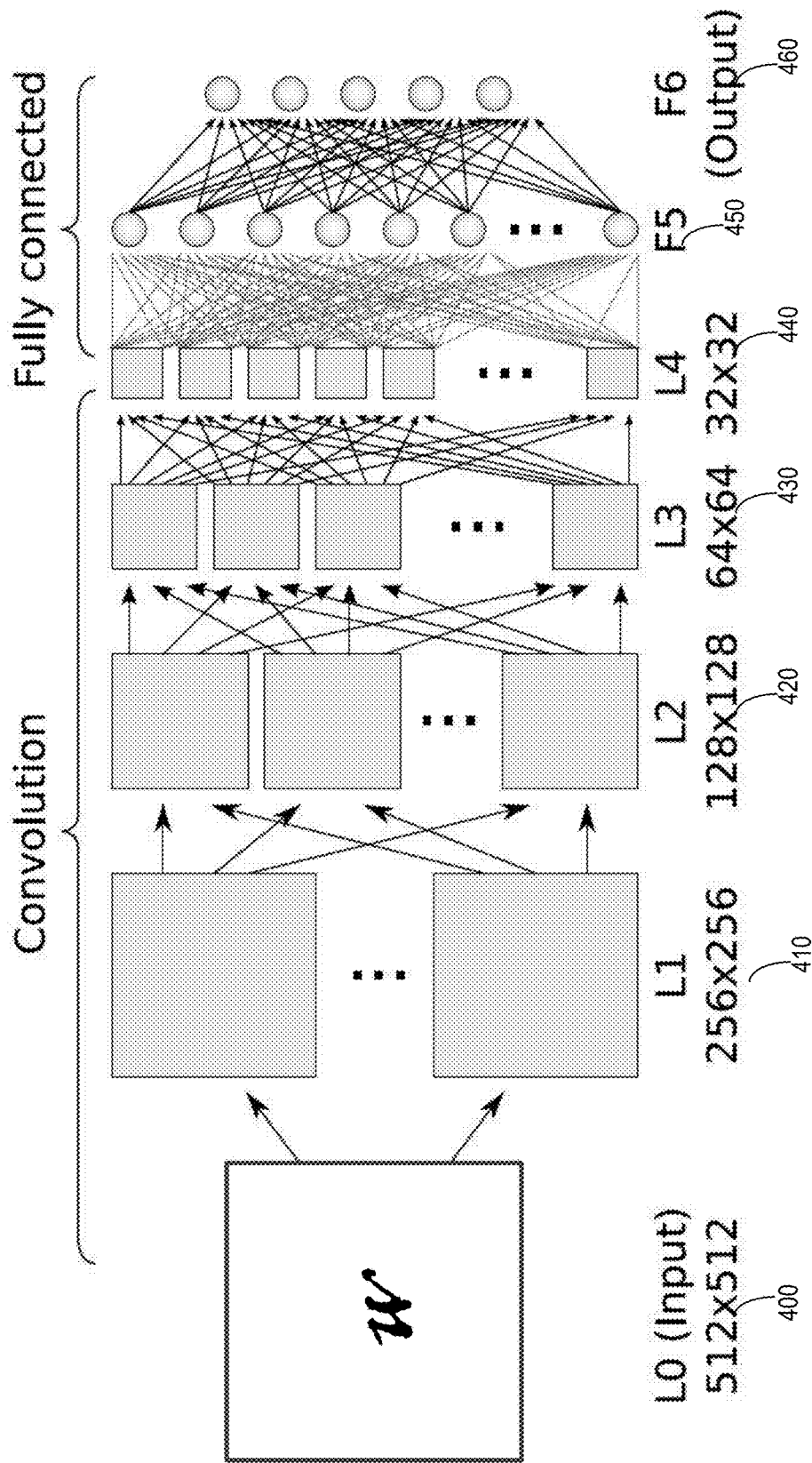
FIG. 4 illustrates a simplified block diagram of a CNN, which is interpreting a sample input map.

FIG. 4 illustrates a simplified block diagram of a CNN, which is interpreting a sample input map 400. This particular example uses a handwritten letter "w" as an input map, however, it is understood that other types of input maps are possible. In the illustrated example, the input map 100 is used to create a set of values for the input layer 410, or "layer-1." For example, layer-1 can be generated by direct mapping of a pixel of the sample input map 400 to a particular neuron in layer-1, such that the neuron shows a 1 or a 0 depending on whether the pixel exhibits a particular attribute. Another example method of assigning values to neurons is discussed below with reference to convolutional neural networks. Depending on the vagaries of the neural network and the problem it is created to solve, each layer of the network can have differing numbers of neurons, and these may or may not be related to particular qualities of the input data.

Referring to FIG. 4, neurons in layer-1 410 are connected to neurons in a next layer, layer-2 420, as described earlier (see FIG. 3). The neurons in FIG. 4 are as described with reference to FIG. 1. A neuron in layer-2 420, consequently, receives an input value from each of the neurons in layer-1 410. The input values are then summed and this sum compared to a bias. If the value exceeds the bias for a particular neuron, that neuron then holds a value, which can be used as input to neurons in the next layer of neurons. This computation continues through the various layers 430-450 of the CNN, until it reaches a final layer 460, referred to as "output" in FIG. 4. In an example of a CNN used for character recognition, each value in the layer is assigned to a particular character. The network is configured to end with the output layer having only one large positive value in one neuron, which then demonstrates which character the network has computed to be the most likely handwritten input character.

The data values for each layer in the CNN is typically represented using matrices (or tensors in some examples) and computations are performed as matrix computations. The indexes (and/or sizes) of the matrices vary from layer to layer and network to network, as illustrated in FIG. 4. Different implementations orient the matrices or map the matrices to computer memory differently. Referring to FIG. 4, in the example CNN illustrated, each level is a matrix of neuron values, as is illustrated by matrix dimensions for each layer of the neural network. The values in a matrix at a layer are multiplied by connection strengths, which are in a transformation matrix. This matrix multiplication scales each value in the previous layer according to the connection strengths, and then summed. A bias matrix is then added to the resulting product matrix to account for the threshold of each neuron in the next level. Further, an activation function is applied to each resultant value, and the resulting values are placed in the matrix for the next layer. In an example, the activation function can be rectified linear units, sigmoid, or tan h( ). Thus, as FIG. 4 shows, the connections between each layer, and thus an entire network, can be represented as a series of matrices. Training the CNN includes finding proper values for these matrices.

While fully-connected neural networks are able, when properly trained, to recognize input patterns, such as handwriting, they can fail to take advantage of shape and proximity when operating on input. For example, because every pixel is operated on independently, the neural network can ignore adjacent pixels. A CNN, in comparison, operates by associating an array of values, rather than a single value, with each neuron. Conceptually, the array is a subset of the input pattern, or other parts of the training data. The transformation of a neuron value for the subsequent layer is generated using convolution. Thus, in a CNN the connection strengths are convolution kernels rather than scalar values as in a full-network.

Figure 5:
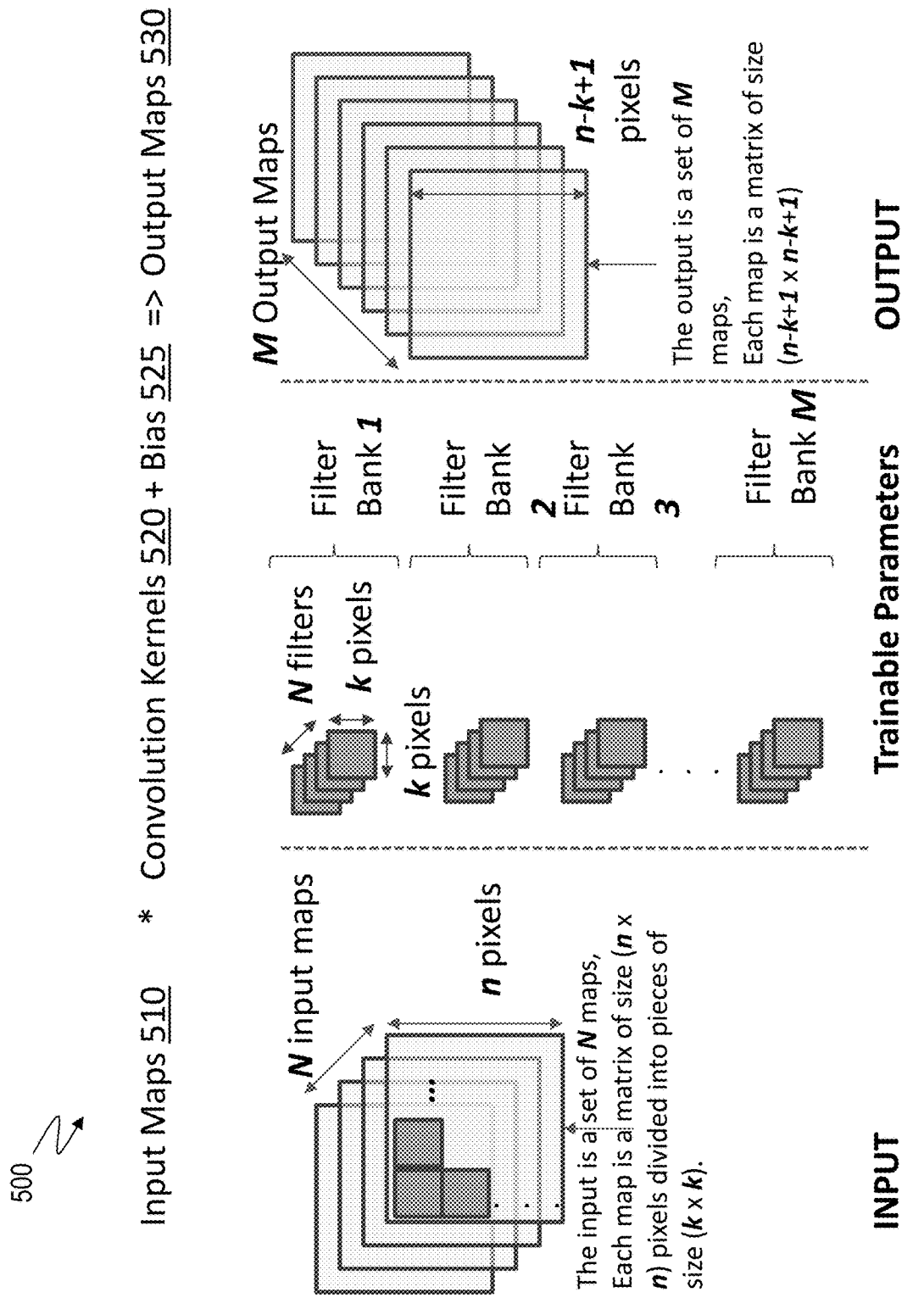
FIG. 5 illustrates an example convolutional layer in a CNN being trained using training data that includes input maps and convolution kernels.

FIG. 5 illustrates an example convolutional layer 500 in a CNN being trained using training data that includes input maps 510 and convolution kernels 520. For simplicity, FIG. 5 does not illustrate bias matrices 525. The input maps 510 can include multiple input patterns, for example N input maps. Each input map is a matrix, such as a square matrix of size n×n. The input maps are convolved with convolution kernels 520 of size k×k as illustrated to produce M output maps 530 of size n−k+1×n−k+1. Each convolution is a 3D convolution involving the N input maps. It should be noted that, in other examples, the input maps 510, the kernels 520, and the output maps 530 are not square matrices. A CNN can include multiple such layers, where the output maps 530 from a previous layer are used as input maps 510 for a subsequent layer. The backpropagation algorithm can be used to learn the weight values of the k×k×M×N filters.

For example, the input maps 510 are convolved with each filter bank to generate a corresponding output map. For example, in case the CNN is being trained to identify handwriting, the input maps 510 are combined with a filter bank that includes convolution kernels representing a vertical line. The resulting output map identifies vertical lines that are present in the input maps 510. Further, another filter bank can include convolution kernels representing a diagonal line, such as going up and to the right. An output map resulting from a convolution of the input maps 510 with the second filter bank identifies samples of the training data that contain diagonal lines. The two output maps show different information for the character, while preserving pixel adjacency. This can result in more efficient character recognition.

Figure 6:
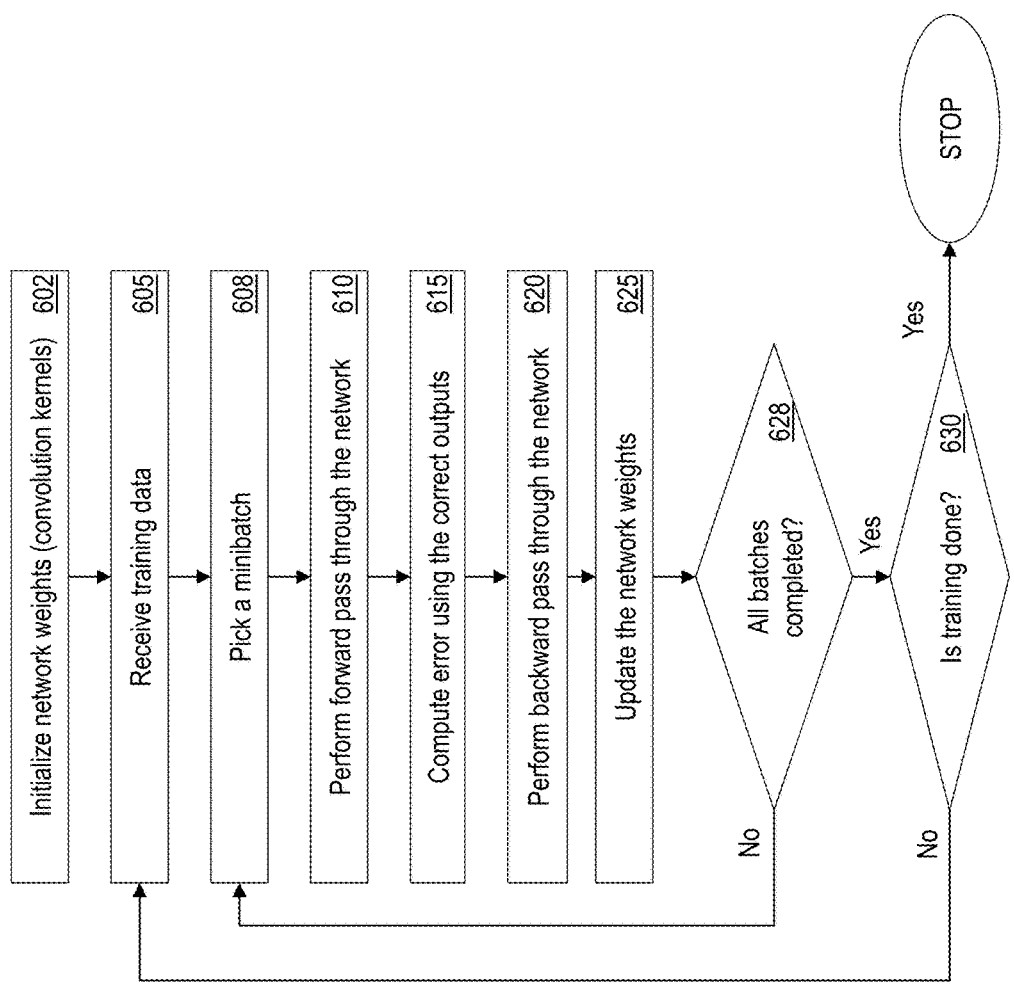
FIG. 6 illustrates an example flowchart for training a CNN with one or more convolutional layers.

FIG. 6 illustrates an example flowchart for training a CNN with one or more convolutional layers 500. The example logic can be implemented by a processor, such as a central processing unit (CPU), a graphics processing unit (GPU), a digital signal processor (DSP), or any other processor or a combination thereof. Alternatively or in addition, the training can be performed by a system that is equipped with an RPU array as described herein. The CNN can be initialized using random weights for the neurons, as shown at block 602. The training data for the CNN 300 is received, as shown at block 605. In an example, the CNN can be pre-set with sample convolutional kernels and biases, which are refined to give consistent and efficient results. The training data typically includes many (on the order of tens of thousands) input training samples 400, which are associated with an expected output 460. For example, the inputs samples 400 can be samples of handwritten samples and the expected outputs 460 can be an indication of the correct character each should be interpreted as. It is understood that recognition of handwritten characters is just an example of using CNNs and that other examples can train the CNN for other technical problems.

In one or more embodiments, the CNN training is performed using batches. Accordingly, a batch of the input data to be used for training is selected, as shown at block 608. Using the input maps 410 and the convolutional kernels 420, the output maps 430 are generated as described herein, as shown at block 610. Generating the output maps 330 is commonly referred to as a "forward pass." Further, the method includes using the output maps 430, to determine how close or far off of the expected character recognition and the CNN was, as shown at block 615. A degree of error with relation to each of the matrices, which include the CNN is determined, such as using a gradient descent. Determining the relative errors is referred to as a "backward pass." The method further includes modifying or updating the matrices to adjust for the error, as shown at block 625. The adjusting the convolution kernels 420 based on the output error information and using it to determine modifications for each neural network matrix, is referred to as an "update pass." The gradient function, in an example, includes partial derivatives for each entry of each neural network matrix with respect to the error. The gradient function represents how much to adjust each matrix according to the gradient descent method. The processor subsequently modifies the matrices, including the convolutional kernels and the biases, according to the gradient function, as shown at block 625. The processor ensures that all batches of the data are used for the training, as shown at block 628.

The modified convolutional kernels 420 after being adjusted can be used for further training of the CNN, unless the training is deemed completed, as shown at block 630. For example, the training can be deemed completed if the CNN identifies the inputs according to the expected outputs with a predetermined error threshold. If the training is not yet completed, another iteration, or training epoch is performed using the modified convolutional kernels from the most recent iteration.

Thus, according to the CNN training above, the CNN learns to model a dependency between the inputs and the expected outputs in the training data. Mathematically, for a vector of input maps S and a vector of outputs X, the CNN learns a model to reduce an error E between S and X. One such error function is the mean square error between S and X, for example:

$$E = \Sigma_t \| f(S(t)) - X(t) \|^2$$

Other error functions can include, for example, cross-entropy or logistic loss.

The CNN, for each layer, adapts a matrix of weights A and a vector of biases a to optimize E. To this end, in the forward pass, a value for each value of a next layer (B, b) is calculated using values of the current layer (A, a). For example, the computations in the forward pass for a layer can be represented as $X = f(S) = B\varphi(AS+a)+b$, where, A is the matrix of weights of a current layer, a is a bias vector of the current layer, and B and b are weight matrix and bias of the next layer of the CNN. The function $\varphi$ represents an element-wise non-linear relation. In the forward pass, the predicted outputs corresponding to the inputs are evaluated according to the above equation. In the backward pass, partial derivatives of the cost function (E) with respect to the different parameters are propagated back through the CNN. The network weights are then be updated using a gradient-based optimization algorithm, such as the gradient descent. The whole process is iterated until the weights have converged. This approach is computationally rather intensive. Training a CNN in the above method is a time consuming process because the forward, backward, and update passes involve convolution operations.

Figure 7A:
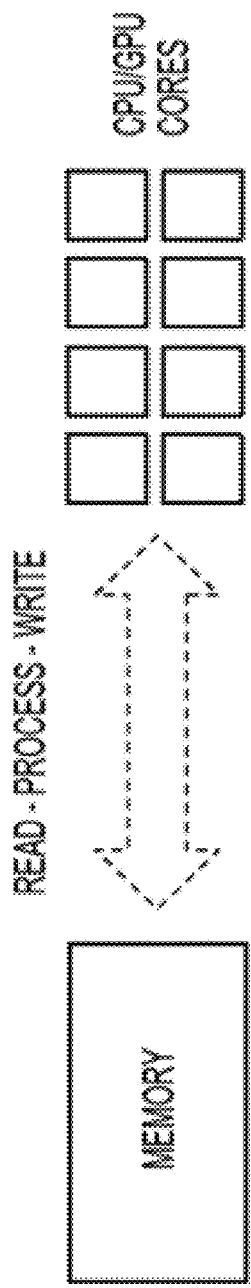
FIG. 7A depicts a simplified illustration of a typical read-process-write weight update operation.

FIG. 7A depicts a simplified illustration of a typical read-process-write weight update operation, wherein CPU/GPU cores (i.e., simulated "neurons") read a memory (i.e., a simulated "synapse") and perform weight update processing operations, then write the updated weights back to memory. Executing offline training can be difficult and resource intensive because it is typically necessary during training to modify a significant number of adjustable parameters (e.g., weights) in the CNN model to match the input-output pairs for the training data. In one or more examples, crosspoint array that includes a plurality of crosspoint devices is used for training the CNN. The crosspoint array can be part of a chip, such as an ANN chip. In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power. Accordingly, simplifying the crosspoint devices of ANN architectures to prioritize power-saving for offline learning techniques typically means that training speed and training efficiency for CNNs are not optimized. Providing crosspoint devices that keep power consumption within an acceptable range, as well as accelerate the speed and efficiency of training CNN architectures, would improve overall CNN performance and allow a broader range of CNN applications.

Turning now to an overview of the present description, one or more embodiments are directed to a two-terminal programmable resistive crosspoint component referred to herein as a resistive processing unit (RPU), which provides local data storage functionality and local data processing functionality. In other words, when performing data processing, the value stored at each RPU is updated in parallel and locally, which eliminate the need to move relevant data in and out of a processor and a separate storage element. Additionally, the local data storage and local data processing provided by the described two-terminal RPUs accelerate the CNN's ability to learn and implement algorithms such as backpropagating online neural network training, matrix inversion, matrix decomposition and the like. Accordingly, implementing a machine learning CNN architecture having the described RPU enables the implementation of online machine learning capabilities that optimize the speed, efficiency, and power consumption of learning. The described RPU and resulting CNN architecture improve overall CNN performance and enable a broader range of practical CNN applications.

The described RPU can be implemented as two-terminal resistive crosspoint devices, wherein their switching characteristics have a non-linearity that can be used for processing data. Thus, the described RPU can be implemented by a two-terminal device having an appropriate non-linear characteristic that can be used to perform calculations in a CNN. For example, the described RPU device can be implemented with resistive random access memory (RRAM), phase change memory (PCM), programmable metallization cell (PMC) memory, non-linear memristive systems, or any other two-terminal device that has non-linear resistive switching characteristics.

Prior to a more detailed description of the described RPU, an overview of systolic arrays, stochastic computing and linear and non-linear memristor devices, which are relevant to the present description, will now be provided. Systolic arrays are composed of parallel processing elements (PE) that attempt to accelerate the learning of certain highly used algorithms. Systolic arrays are often hard-wired for specific operations, such as "multiply and accumulate," to perform massively parallel integration, convolution, correlation, matrix multiplication or data sorting tasks. In a publication by C. Lehmann et al., titled "A Generic Systolic Array Building Block For Neural Networks with On-Chip Learning," IEEE Transactions On Neural Networks, Vol. 4, No. 3, May 1993, it is proposed to use systolic arrays as a building block for online learning neural networks, wherein each PE in the systolic array has local storage to store a single weight value and is capable of performing computations necessary for matrix multiplication and weight updates. The very-large-scale integration (VLSI) implementation of the PE described in the Lehmann article requires approximately 1800 transistors per PE, which increases power consumption and decreases scalability. It is therefore desirable to provide PEs that requires as few transistors per PE as possible.

Stochastic computing is a collection of techniques that represent continuous values by streams of random bits, wherein complex computations can be computed by simple bit-wise operations on the streams. Specifically, if there are two random and independent bit streams $S_1$, $S_2$ called stochastic numbers (i.e., a Bernoulli process), wherein the probability of a "one" in the first stream is P, and the probability of a "one" in the second stream is q, the logical AND of the two streams can be taken as shown in FIG. 7B. The probability of a "one" in the output stream is pq. By observing enough output bits and measuring the frequency of "ones," it is possible to estimate pq to arbitrary accuracy. Because of the design simplicity of these so-called "multiply and accumulate" operations, which can be implemented with a few logic gates/transistors, stochastic computing is often used in the hardware design for neural networks. A publication by V. K. Chippa et al. titled "StoRM: A Stochastic Recognition and Mining Processor," Proceedings of the 2014 International Symposium On Low power Electronics and Design, shows an application of stochastic computing to two-dimensional (2D) systolic arrays that can be used as a hardware accelerator for neural network training algorithms.

However, in the Chippa et al. article, the necessary weights for the computations are supplied to the systolic array from external locations, and updates to the weights are not performed by the array. The Chippa et al. article only addresses the acceleration of vector-matrix multiplication or matrix-matrix multiplication operations that are heavily used during neural network training. However, systolic arrays without local storage cannot perform the weight updates in parallel because the weights are stored at an external memory location. Accelerating the weight updates, which is not described by the Chippa et al. article, is necessary in order to accelerate the overall learning algorithm.

The term "memristor" is used to describe a passive two-terminal electrical component, wherein the resistance value of the device depends on the history of the voltages that have previously been applied to the component. The operation of a memristor is governed by Equations [1] and [2] shown in FIG. 7C, wherein i is the current passing through the device, v is the voltage applied to the device, g is the conductance value of the device (which is the inverse of the resistance), s is the internal state variable of the device that controls the conductance value and $f$ is the function that shows the time evolution of the internal state variable s. In a publication by Chua, L. O., titled "Resistance Switching Memories are Memristors," Applied Physics A (2011), 102 (4): 765-783, memristor functionality is proposed for the operation of resistive memory devices such as resistive random-access-memory (RRAM), phase change memory (PCM) and conductive-bridging random-access-memory (CBRAM). Because a memristor device remembers its history (i.e., the so-called "non-volatility property"), the Chua article proposes such devices as possible alternatives for non-volatile memory technologies.

A publication by D. Soudry et al., titled "Memristor-Based Multilayer Neural Networks With Online Gradient Descent Training," IEEE Transactions On Neural Networks and Learning Systems (2015), proposes the use of memristors for backpropagating neural network training hardware. However, the Soudry et al article assumes an ideal memristor operation, wherein the change in resistance is linear with respect to the voltage applied to the device. The Soudry et al. design assumed that the function $f(s,v)$ in Equation [2] of FIG. 7C is a simple function given by the relationship $f(s,v)=v$. The Soudry et al. article proposes an architecture that is similar to a 2D systolic array as described above, wherein each crosspoint is implemented with an ideal memristor and a pair of transistors. In the Soudry et al. article, the memristor is in effect used to store the weight value, and the pair of transistors is used to compute a local multiplication operation that is needed for the weight updates, wherein the result of the weight update modifies the memristor's conduction state. The Soudry et al. article describes, in effect, a four terminal device composed of a memristor and two transistors, which are used to make a 2D array of the 4 terminal devices in order to implement the back-propagation training of the neural network hardware.

Turning now to a more detailed description of the present invention, one or more embodiments are directed to two-terminal RPUs, which provide local data storage functionality and local data processing functionality without the necessity of extra circuit elements such as transistors and off-chip storage and/or processing components. The described RPU can be implemented as any device that has a non-linear switching characteristic, including but not limited to RRAM, PCM, CBRAM, non-linear memristive systems, and the like.

When implementing the described RPU device as a memristive system, it is important that the memristor is non-ideal with a non-linear switching characteristic. In an ideal memristor, the change in resistance is linearly proportional to the voltage applied to the ideal memristor device. Accordingly, as soon as an ideal memristor device experiences any voltage its resistance state changes. However, for described RPU devices implemented as non-ideal, non-linear memristive systems, there is a well-defined "SET" voltage, $V_{SET}$, (which is characteristics of the device), and the memristive RPU device would need to experience a voltage $V>V_{SET}$ in order to change its internal resistance state. For such devices, a half bias application of a voltage $V=0.5V_{SET}$ does not cause any change in the internal resistance state.

To further illustrate the difference between an ideal memristor and a non-ideal, non-linear memristor that can be used to implement the described RPU, FIG. 7D is a graph illustrating a comparison between the voltage switching behaviors of an ideal memristor and an RPU in accordance with the present invention. The vertical axis represents device state change at a particular voltage, and the horizontal axis represents the voltage applied. In an ideal memristor operation, a change in resistance is linearly proportional to the voltage applied to the device. Thus, as soon as the memristor sees any voltage, its resistance state changed. This is shown by curve 702, which shows that the change in state is dramatic even at low voltages.

For non-linear RPU devices as shown by the curve 704, there is a predefined set voltage, $V_{SET}$, that the device needs to experience in order to change its internal resistance state. A bias voltage of $0.5V_{SET}$ will not change the internal resistance state. In the present description, this non-linear characteristic of the RPU device is used to perform multiplication locally. Assuming $f_1$ is small, the device will not change its internal state when only $0.5V_{SET}$ is applied. Notably, FIG. 7D illustrates positive voltages and positive changes to the resistive state of the RPU device, however, a similar relationship between negative voltages and negative resistance changes also exists.

Figure 8:
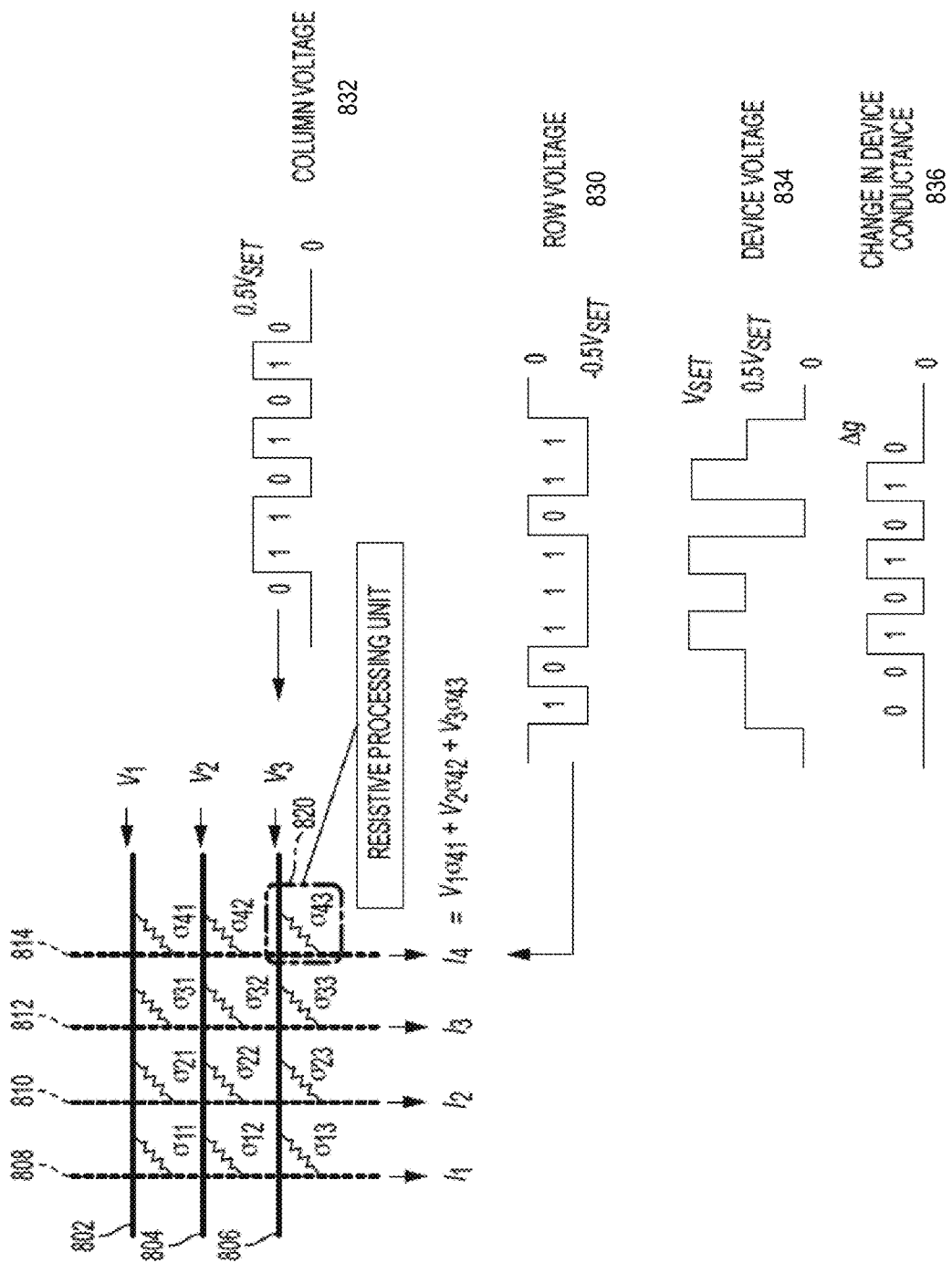
FIG. 8 depicts a cross bar array of two-terminal, non-linear RPU devices according to the present invention, along with voltage sequences illustrating the operation of the RPU.

FIG. 8 is a diagram of a two-dimensional (2D) crossbar array 800 that performs forward matrix multiplication, backward matrix multiplication and weight updates according to the present description. Crossbar array 800 is formed from a set of conductive row wires 802, 804, 806 and a set of conductive column wires 808, 810, 812, 814 that intersect the set of conductive row wires 802, 804, 806. The intersections between the set of row wires and the set of column wires are separated by RPUs, which are shown in FIG. 8 as resistive elements each having its own adjustable/updateable resistive weight, depicted as $\sigma_{11}$, $\sigma_{21}$, $\sigma_{31}$, $\sigma_{41}$, $\sigma_{12}$, $\sigma_{22}$, $\sigma_{32}$, $\sigma_{42}$, $\sigma_{13}$, $\sigma_{23}$, $\sigma_{33}$ and $\sigma_{43}$, respectively. For ease of illustration, only one RPU 820 is labeled with a reference number in FIG. 8. In forward matrix multiplication, the conduction state (i.e., the stored weights) of the RPU can be read by applying a voltage across the RPU and measuring the current that passes through the RPU.

Input voltages $V_1$, $V_2$, $V_3$ are applied to row wires 802, 804, 806, respectively. Each column wire 808, 810, 812, 814 sums the currents $I_1$, $I_2$, $I_3$, $I_4$ generated by each RPU along the particular column wire. For example, as shown in FIG. 8, the current $I_4$ generated by column wire 814 is according to the equation $I_4 = V_1\sigma_{41} + V_2\sigma_{42} + V_3\sigma_{43}$. Thus, array 800 computes the forward matrix multiplication by multiplying the values stored in the RPUs by the row wire inputs, which are defined by voltages $V_1$, $V_2$, $V_3$. The backward matrix multiplication is very similar. In backward matrix multiplication, voltages are applied at column wires 808, 810, 812, 814 then read from row wires 802, 804, 806. For weight updates, which are described in greater detail below, voltages are applied to column wires and row wires at the same time, and the conductance values stored in the relevant RPU devices all update in parallel. Accordingly, the multiplication and addition operations required to perform weight updates are performed locally at each RPU 820 of array 800 using the RPU device itself plus the relevant row or column wire of array 800. Thus, in accordance with the present invention, no read-update-write cycles (shown in FIG. 7A) are required in array 800.

Continuing with the diagram of FIG. 8, in accordance with one or more embodiments, the operation of a positive weight update methodology for RPU 820 and its corresponding weight $\sigma_{33}$ at the intersection of conductive row wire 806 and conductive column wire 812 will now be provided. The non-linear characteristics of RPU 820 are used to perform multiplication operations locally at RPU 820 using stochastic computing as described below. More specifically, the described methodology uses the non-linear switching characteristics of RPU 820 and stochastic bit streams 830, 832 to perform multiplication operations and the necessary weight updates locally at RPU 820 without the necessity of other circuit elements. Update generator circuitry (not shown) is provided at the periphery of crossbar array 800 and used as a peripheral "translator" in order to generate necessary voltage pulses in the form of stochastic bit streams (e.g., 830, 832) that would be applied to all RPUs of 2D crossbar array 800 in parallel. In the example illustrated in FIG. 8, the RPU 820 computes a multiplication of two numbers, 4/8 and 6/8, which are input respectively via the row voltage and column voltage directed to the RPU 820.

Referring briefly to the diagram of FIG. 7D, it is assumed that $f_1$ for RPU 820 shown in FIG. 8 is very small (e.g., $f_1=0$) which means that RPU 820 does not change its internal state when only $0.5V_{SET}$ is applied to it. A row voltage sequence or bit stream 830, which is applied to row wire 806, is shown as a sequence of voltage pulses representing weight updates having a voltage of zero or a voltage of $+0.5V_{SET}$. A column voltage sequence or bit stream 832, which is applied to column wire 814, is shown as a sequence of voltage pulses also representing weight updates having either a voltage of zero or a voltage of $-0.5V_{SET}$. In example of FIG. 8, 4/8 is encoded by row voltage sequence 830, and 6/8 is encoded by column voltage sequence 832. The example voltage sequences 830, 832 represent a positive resistance change phase of the weight update. After the positive weight updates are performed, a separate set of sequences with the polarity of the respective voltages reversed can be used to update weights in a negative direction for those weights that need such correction.

Voltage sequence 834 is the voltages applied to RPU 820 resulting from the difference between row voltage sequence 830 and column voltage sequence 832. Voltage sequence 834 has 3 voltage steps at 0V, $0.5V_{SET}$ and $V_{SET}$. However, because the resistance $\sigma_{43}$ of RPU 820 only changes for device voltages reaching $V_{SET}$, a single pulse sent either through a column wire or through a row wire is not enough to change the resistance state of RPU 820. When a column wire sends a voltage at $0.5V_{SET}$, and a row wire sends a voltage at $-0.5V_{SET}$, the resulting $V_{SET}$ pulse applied to the relevant RPU will cause an incremental change in the resistance of the device. Accordingly, the voltage pulses applied to RPU 820 utilize the non-linear switching characteristic of RPU 820 in order to perform a bit wise stochastic AND operation (e.g., as shown in FIG. 7B) locally at RPU 820. Hence, the resulting change in the stored weight (e.g., $\sigma_{43}$), represented by the change in device conductance 836, of the RPU is proportional to the product of the two numbers (4/8*6/8=3/8) "translated" by update generator circuitry, which is peripheral to crossbar array 800.

Figure 9:
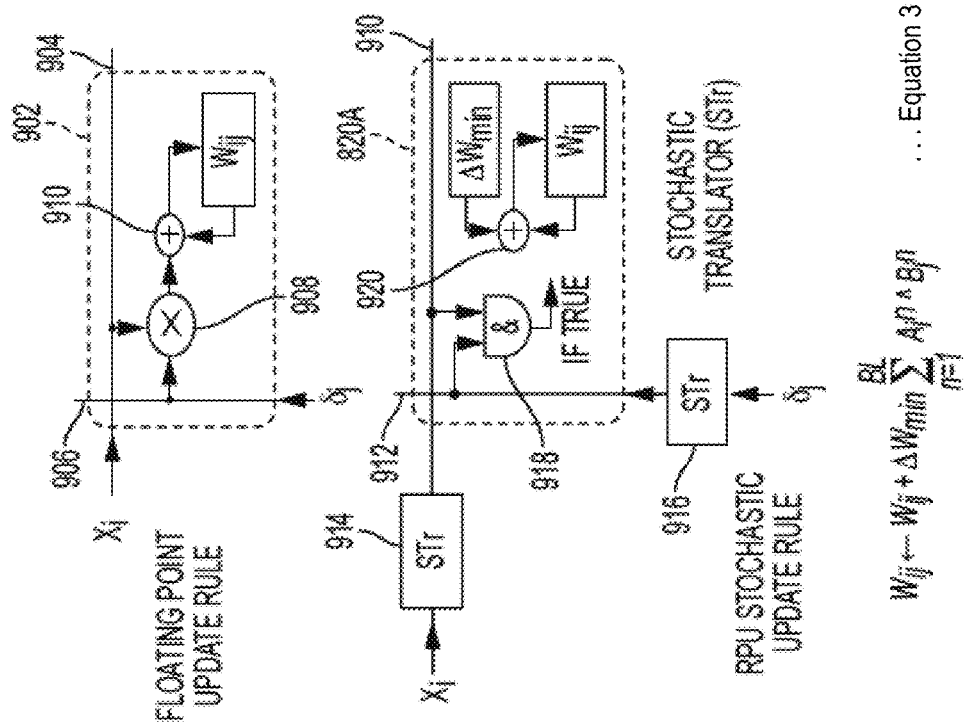
FIG. 9 depicts a simplified block diagram of a stochastic weight update methodology according to one or more embodiments.

FIG. 9 illustrates a comparison of the update operation of an exemplary known floating point (FP) weight update rule against the described stochastic-RPU (SRPU) update rule. The FP weight update rule requires calculating a vector-vector outer product which is equivalent to a multiplication operation and an incremental weight update to be performed locally at each cross-point as shown in FIG. 9. The FP weight update rule can be expressed as $w_{ij} \leftarrow w_{ij} + \eta x_i \delta_j$, wherein $w_{ij}$ represents the weight value for the $i^{th}$ row and the $j^{th}$ column, $x_i$ is the activity at the input neuron, $\delta j$ is the error computed by the output neuron and $\eta$ is the global learning rate.

As shown in FIG. 9, the FP weight update rule uses a FP crosspoint device 902 located at a crosspoint between a row wire 904 and a column wire 906 of a crossbar array (not shown). FP crosspoint device 902 includes processing components (not shown) having more than two terminals, wherein the processing components receive update data as FP numbers via signals $x_i$ and $\delta_j$ applied at row wire 904 and column wire 906, respectively. FP crosspoint device 902 calculates the weight update, $W_{ij}$, using multiplication operations 908 and addition operations 910, then stores the weight update, $W_{ij}$. The FP weight update rule provides accuracy but requires either a read-write-process update operation (e.g., shown in FIG. 7A) or relatively complex and power consuming local processing components having more than two terminals.

An embodiment of the described SRPU weight update rule is shown in Equation 3 of FIG. 9, where BL is length of the bit stream that is used during the update cycle, $\Delta w_{min}$ is the effective change in the weight value due to a single coincidence event, $A_i^n$ and $B_j^n$ are random variables that are characterized by the Bernoulli process, and their success rates are controlled by xi and δj respectively and superscript n represents pulse index. The SRPU weight update rule shown in FIG. 9 enables all of the RPU devices in a single array to work in parallel and perform the local multiplication operation by simply relying on the statistics of coincidence events. However, because of the stochastic nature of the updates, the results would always be probabilistic and the variance to mean ratio of the multiplication operation would be proportional to an inverse of the square root of BL.

As shown in FIG. 9, the SRPU weight update rule uses a RPU crosspoint device 820A, which operates in substantially the same manner as RPU 820 shown in FIG. 8 and described in detail above. RPU 820A is located at a crosspoint between a row wire 910 and a column wire 912 of a crossbar array (not shown). RPU 820A includes processing components (shown at 820 in FIG. 8) having two terminals, wherein the processing components receive update data as stochastic numbers via stochastic signals generated by stochastic translators 914, 916 that receive input data $x_i$ and $\delta_j$ and apply stochastic voltage sequences to row wire 912 and column wire 914, respectively. RPU 820A calculates the new value of $W_{ij}$, using the stochastic bit streams, the non-linear characteristics of the RPU 820A, an AND operation 918 and an addition operation 920. More specifically, RPU 820A causes an incremental conductance change that is equivalent to a weight change, $\Delta w_{min}$, for every coincidence event and adds $\Delta w_{min}$ to the stored weight value to arrive at the updated weight value, $W_{ij}$.

Figure 10A:
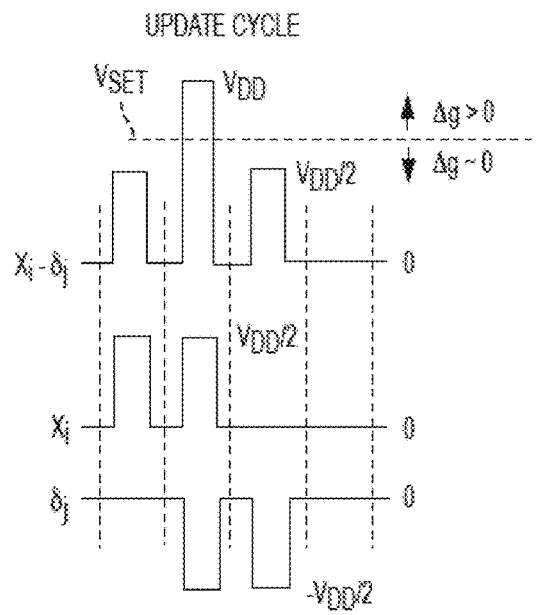
FIGS. 10A-D depict simplified diagrams and graphs illustrating additional details for implementing stochastic weight updates using a two-terminal, non-linear RPU according to one or more embodiments.
Figure 10B:
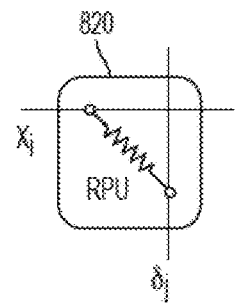
Figure 10C:
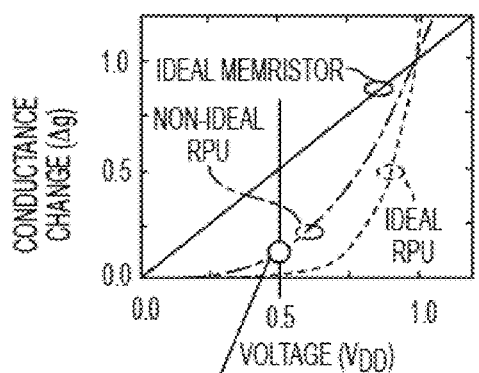
Figure 10D:
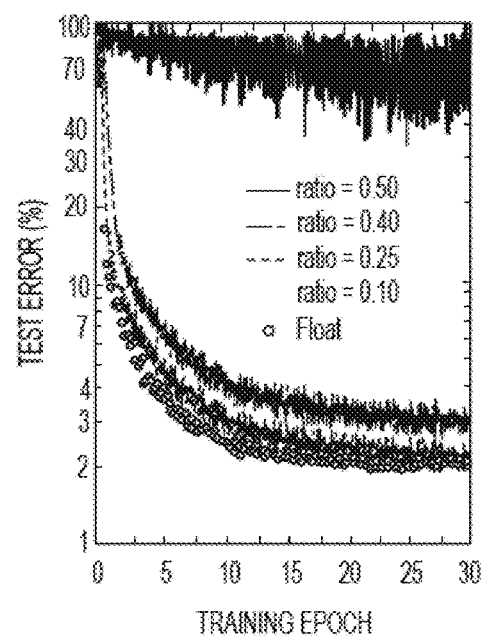

FIGS. 10A-D depict simplified diagrams and graphs illustrating how a measure of RPU linearity (r) can be calculated for the described stochastic weight updates using a two-terminal, non-linear RPU according to one or more embodiments. FIG. 10A depicts the stochastic voltage sequences, which have previously described, and FIG. 10B depicts RPU 820, which receives and responds to the stochastic voltage sequences. FIG. 10A, also depicts, Δg, which is the change in the RPU's conduction value in response to the voltage sequences applied at $x_i$ and $\delta_j$. More specifically, Δg is the response of RPU 820 to a voltage pulse that reaches $V_{DD}$. Accordingly, a device linearity ratio, r, can be determined according to the equation shown in FIG. 10A. FIG. 10C is a switching diagram, similar to FIG. 7D, which plots Δg vs. VDD, compares the response of an ideal memristor against a non-ideal RPU and an ideal RPU. FIG. 10C depicts the classification errors for different non-linearity ratios. FIGS. 10C and 10D demonstrate that RPU 820 can be designed and operated at different levels of non-linearity by changing the relevant parameters, and that even if RPU 820 is non-ideal, it can still be operated at acceptable classification error rates.

Figure 11B:
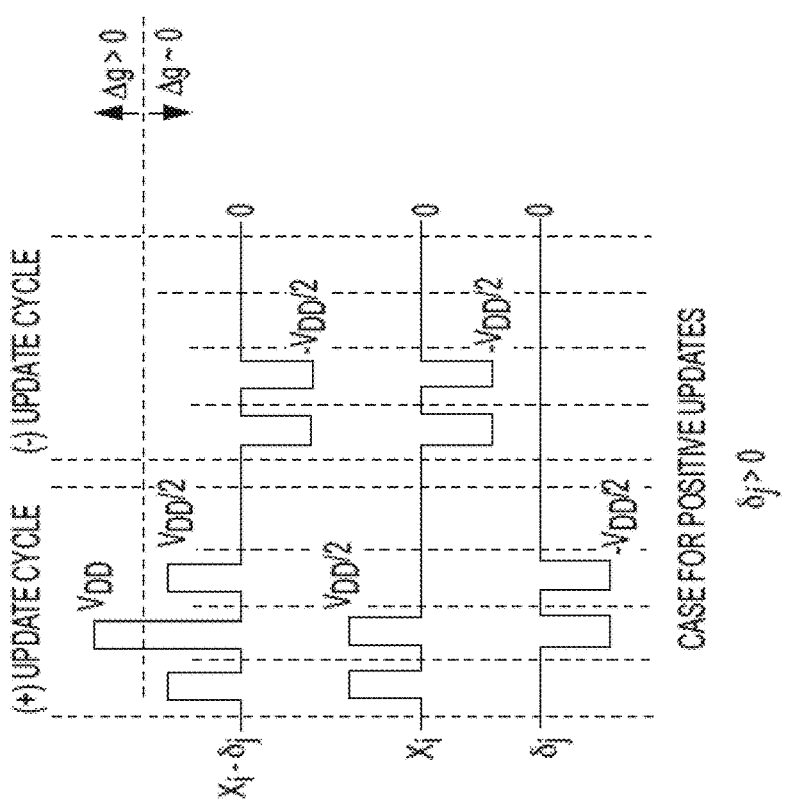
FIGS. 11A-11B depict voltage sequences illustrating examples of positive and negative stochastic weight update cycles according to one or more embodiments.
Figure 11A:
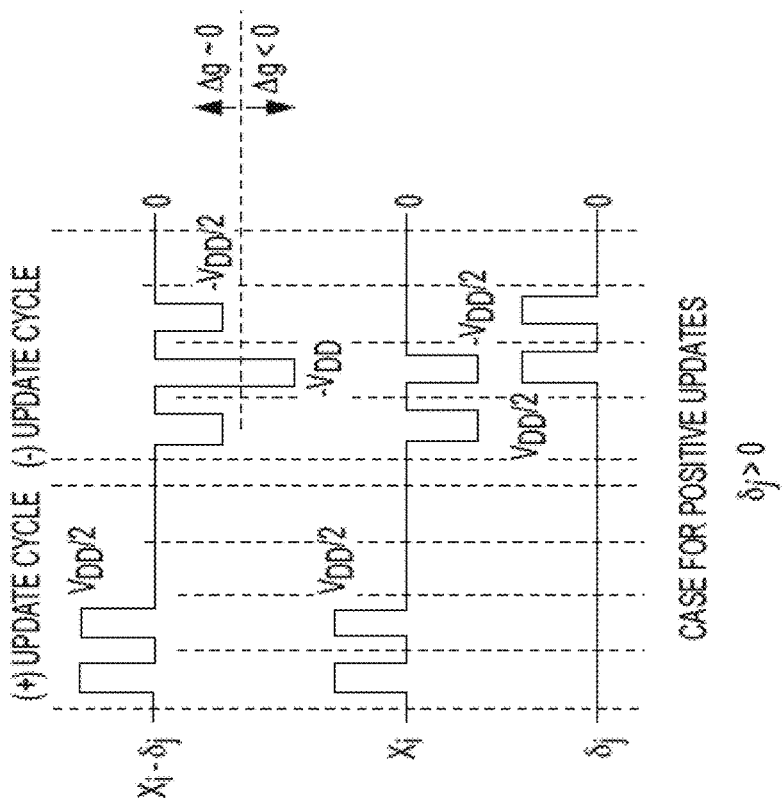

FIG. 10A depicts positive update cycle pulses. FIGS. 11A and 11B depict that, by changing the polarity of pulses, both positive and negative update cycles can be implemented.

Figure 12:
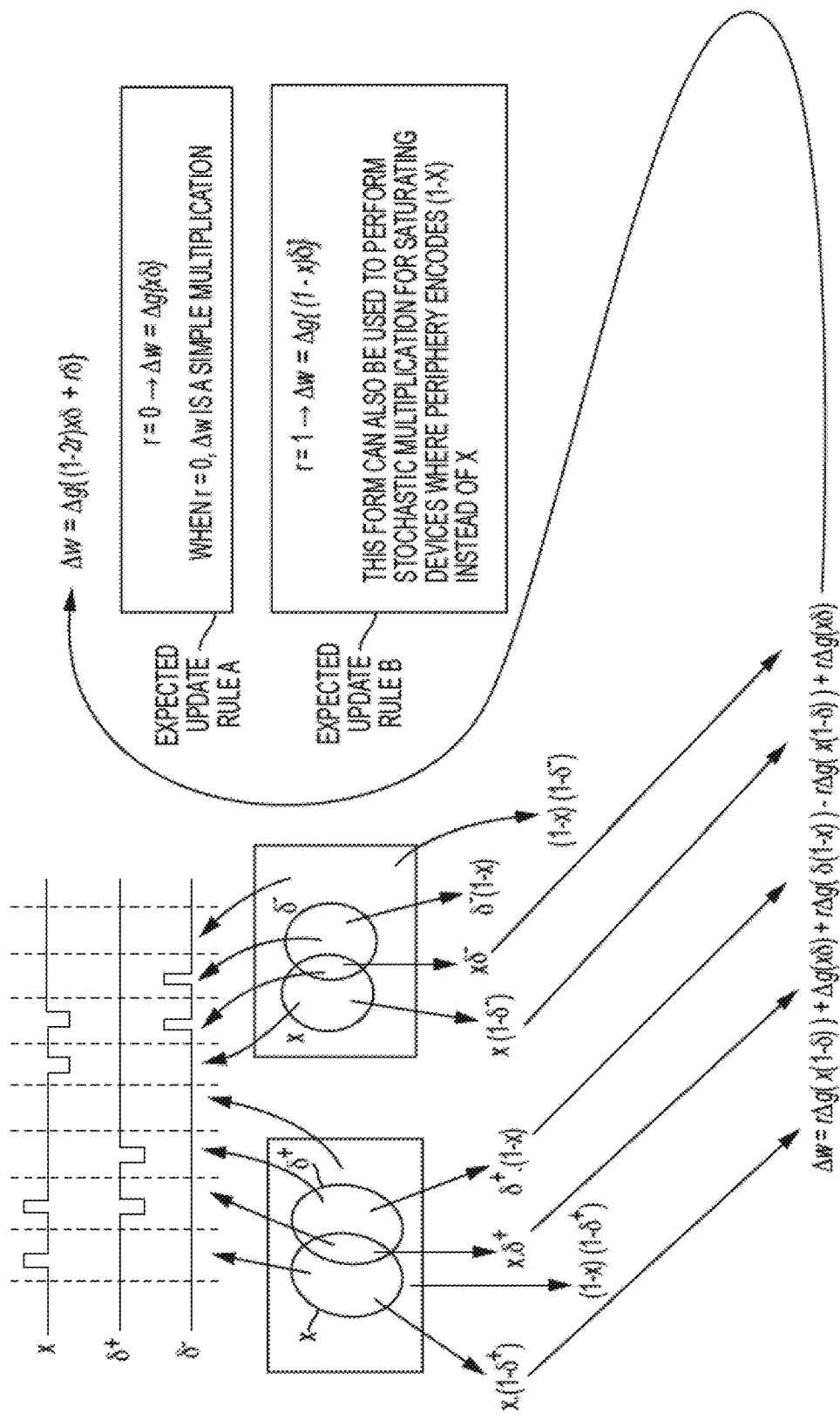
FIG. 12 depicts simplified diagrams and graphs illustrating additional details for implementing stochastic weight updates using a two-terminal, non-linear RPU according to one or more embodiments.

FIG. 12 depicts simplified diagrams and graphs illustrating additional details for implementing stochastic weight updates using a two-terminal, non-linear RPU according to one or more embodiments. FIG. 12 demonstrates on average how much weight change Δw will be obtained by the positive and negative pulsing scheme shown in FIGS. 11A and 11B. Accordingly, $x_i$ and $\delta_j$ populate both the positive update cycle and the negative update cycle based on the respective pulse sign. This guarantees that when there is overlap on the RPU, the voltage on the RPU is capable of passing the threshold in either the positive direction or the negative direction based on the sign of Δg. The diagrams shown below the pulse sequences are graphical representations of how the pulses x, $\delta^+$ and $\delta^-$ in the pulse sequences interact. By summing the expected values, as shown by the equation for Δw based on the contributions from the half pulses and full pulses, two forms of the final expected update rule Δw can be derived.

Figure 13B:
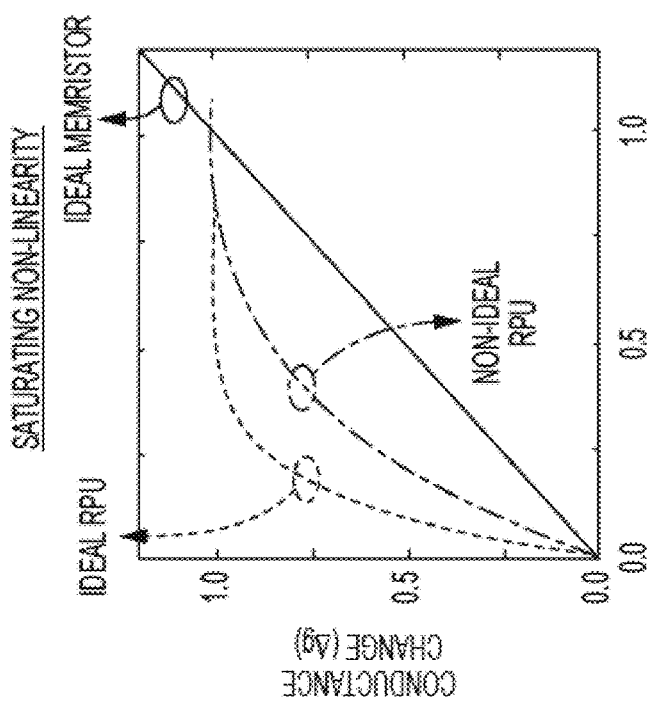
FIG. 13A-B depict graphical comparisons between the linear switching characteristic of a known two-terminal memristor and the non-linear switching characteristic of a two-terminal RPU of the present invention.
Figure 13A:
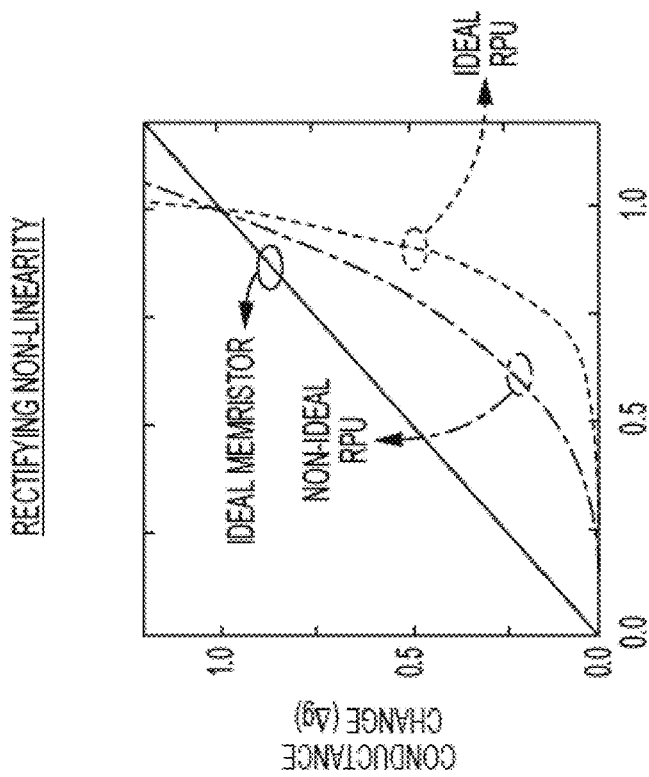

FIGS. 13A and 13B depict a side by side comparison a rectifying non-linearity (also shown in FIG. 10C) of the described RPU and a saturating non-linearity of the described RPU. For the non-saturating linearity, it will be necessary to, instead of encoding x into the RPU, encode 1-x in order for the saturating non-linear RPU to perform the necessary multiplication.

FIGS. 14 and 15 depicts graphs, diagrams and equations illustrating an expected weight update rule Δw when a height-modulation pulsing scheme is used, along with a two-terminal RPU having an exponential non-linearity. In this example, the stochastic encoding is replaced by voltage height modulation. As shown in FIG. 15, a Taylor expansion can be used to simplify the expected weight update rule to Δw=xδ. Accordingly, the derivation shown in FIGS. 14 and 15 demonstrates that the higher order terms shown in FIGS. 14 and 15 do not matter, and the exponential, height modulated RPU works as well as the previously described embodiments, as shown by the graph shown at the lower right of FIG. 15.

FIGS. 16-18 depict aspects of developing, training and using an ANN architecture that includes crossbar arrays of two-terminal, non-liner RPUs according to the present invention. FIG. 16 depicts a starting point for designing a neural network, such as a CNN. In effect, FIG. 16 is an alternative representation of the neural network diagram shown in FIG. 3, or in FIG. 5. As shown in FIG. 16, the input neurons, which are $x_1$, $x_2$ and $x_3$ are connected to hidden neurons, which are shown by sigma (σ). Weights, which represent a strength of connection, are applied at the connections between the input neurons/nodes and the hidden neurons/nodes, as well as between the hidden neurons/nodes and the output neurons/nodes. The weights are in the form of a matrix. As data moves forward through the network, vector matrix multiplications are performed, wherein the hidden neurons/nodes take the inputs, perform a non-linear transformation, and then send the results to the next weight matrix. This process continues until the data reaches the output neurons/nodes. The output neurons/nodes evaluate the classification error, and then propagate this classification error back in a manner similar to the forward pass, which results in a vector matrix multiplication being performed in the opposite direction. For each data set, when the forward pass and backward pass are completed, a weight update is performed. Each weight is updated proportionally to the input to that weight as defined by the input neuron/node and the error computed by the neuron/node to which it is connected.

FIG. 17 shows an example in which that the neural network is divided into building blocks that are connected by repeaters, facilitating the neural network to be extended to an arbitrary size. Because the network uses the described RPUs, the information flow is local, which facilitates repeating the building blocks.

Figure 18A:
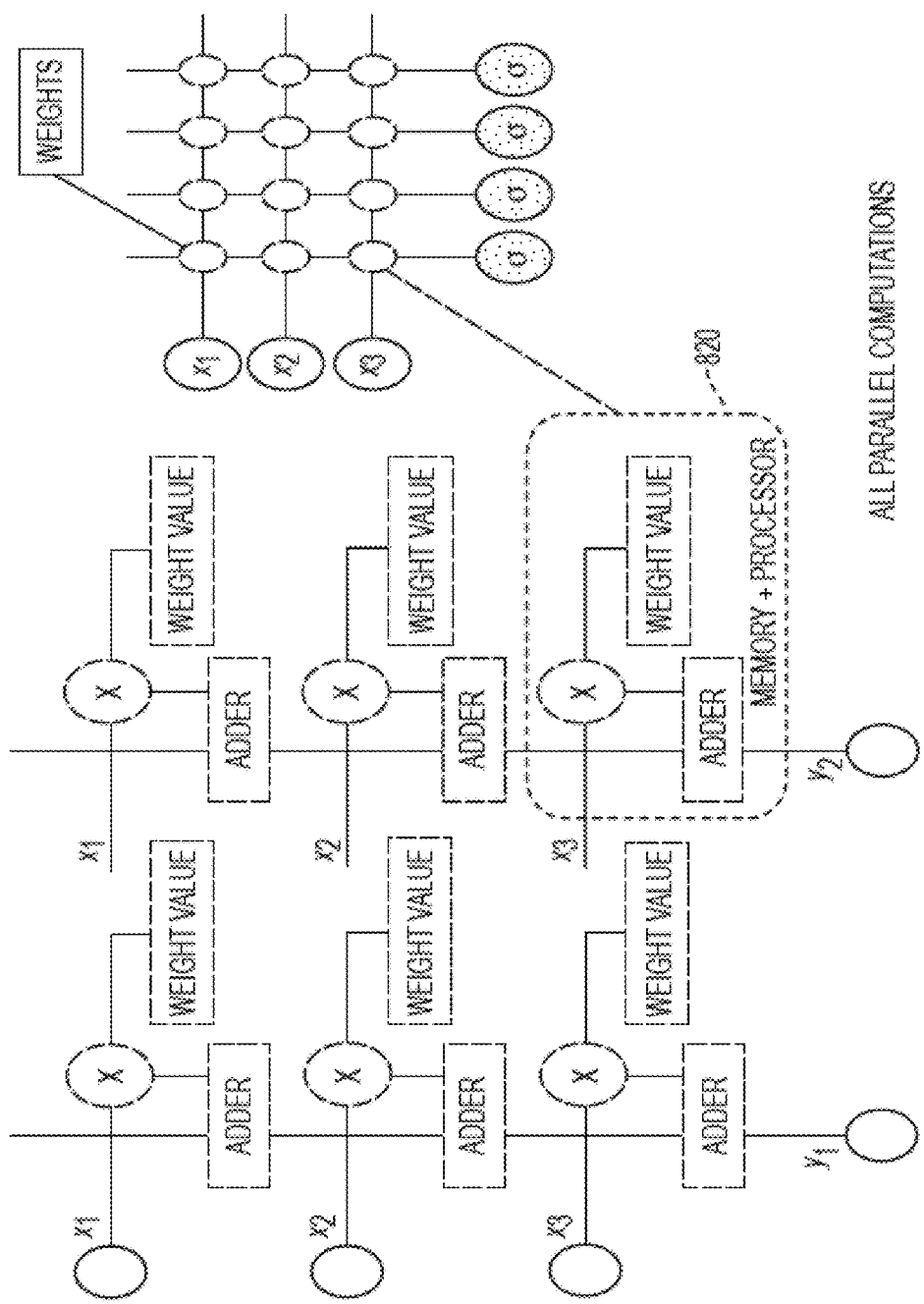
FIG. 18A depicts additional aspects of developing, training and using an ANN architecture that includes crossbar arrays of two-terminal, non-liner RPUs according to the present invention.

FIG. 18A shows the network building block in the forward pass formed from RPU 820 (shown in FIG. 8). RPU 820 can be provided with any of the non-linearity profiles shown in FIG. 7D, 10C, 13A, 13B or 14.

Figure 18B:
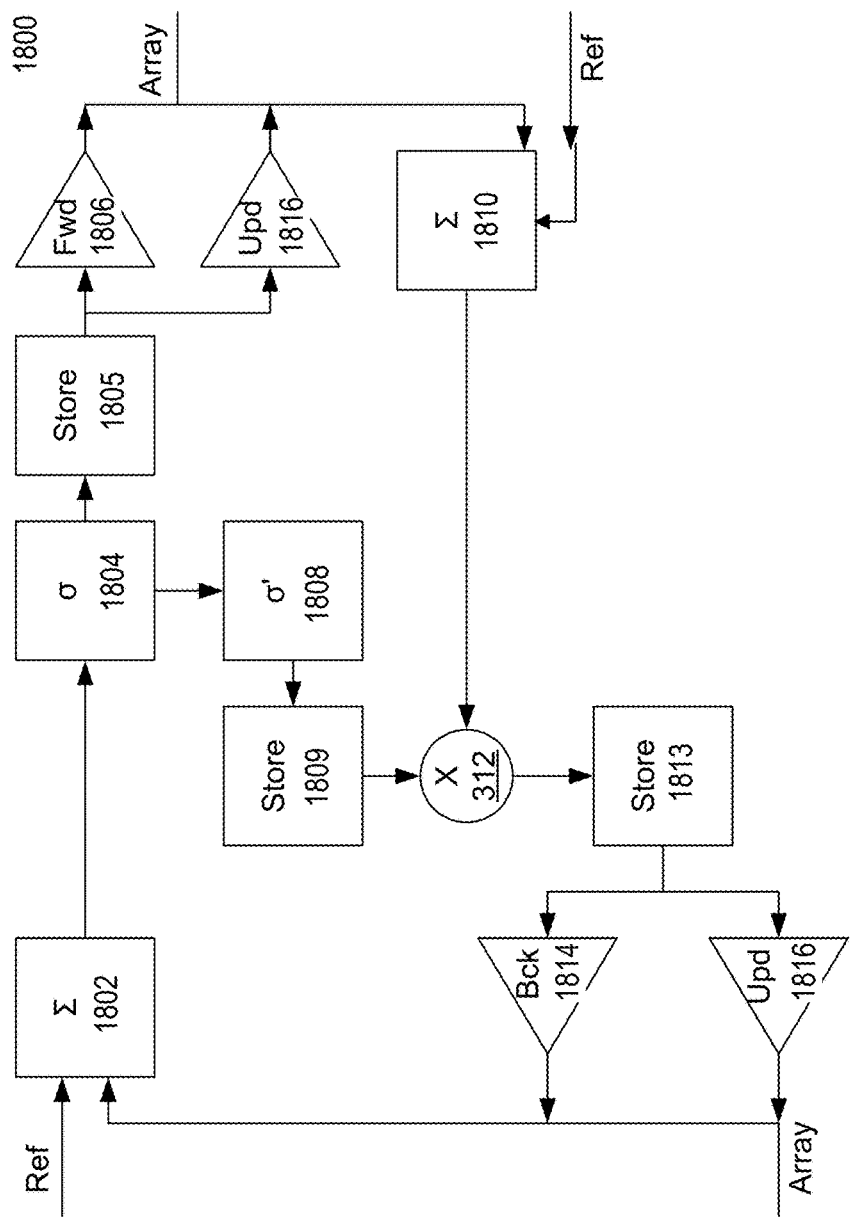
FIG. 18B illustrates a block diagram of the neuron circuit according to one or more embodiments.

FIG. 18B illustrates a block diagram of a neuron, which is used as a neuron 1800 of a neural network, such as a CNN. The neuron can represent any of the input neurons, the hidden neurons, or the output neurons (see FIG. 16). It should be noted that FIG. 18B shows components to address all three phases of operation: feed forward, back propagation, and weight update. However, because the different phases do not overlap, there will necessarily be some form of control mechanism within in the neuron 1800 to control which components are active. It should therefore be understood that there can be switches and other structures that are not shown in the neuron 1800 to handle switching between modes.

In feed forward mode, a difference block 1802 determines the value of the input from the array by comparing it to the reference input. This sets both a magnitude and a sign (e.g., + or −) of the input to the neuron 1800 from the array. Block 1804 performs a computation based on the input, the output of which is stored in storage 1805. It is specifically contemplated that block 1804 computes a non-linear function and can be implemented as analog or digital circuitry or can be performed in software. The value determined by the function block 1804 is converted to a voltage at feed forward generator 1806, which applies the voltage to the next array. The signal propagates this way by passing through multiple layers of arrays and neurons until it reaches the final output layer of neurons. The input is also applied to a derivative of the non-linear function in block 1808, the output of which is stored in memory 1809.

During back propagation mode, an error signal is generated. The error signal can be generated at an output neuron 1808 or can be computed by a separate unit that accepts inputs from the output neurons 1808 and compares the output to a correct output based on the training data. Otherwise, if the neuron 1800 is a hidden neuron 1806, it receives back propagating information from the array of weights 1804 and compares the received information with the reference signal at difference block 1810 to provide a continuously valued, signed error signal. This error signal is multiplied by the derivative of the non-linear function from the previous feed forward step stored in memory 1809 using a multiplier 1812, with the result being stored in the storage 1813. The value determined by the multiplier 1812 is converted to a backwards propagating voltage pulse proportional to the computed error at back propagation generator 1814, which applies the voltage to the previous array. The error signal propagates in this way by passing through multiple layers of arrays and neurons until it reaches the input layer of neurons.

During weight update mode, after both forward and backward passes are completed, each weight is updated proportional to the product of the signal passed through the weight during the forward and backward passes. The update signal generators 1816 provide voltage pulses in both directions (though note that, for input and output neurons, only one direction will be available). The shapes and amplitudes of the pulses from update generators 1816 are configured to change a state of the weights, such that the resistance of the weights is updated.

Thus, the weights of the RPU array are implemented as resistive cross point devices, where their switching characteristics have a non-linearity that can be used for processing data.

Figure 19:
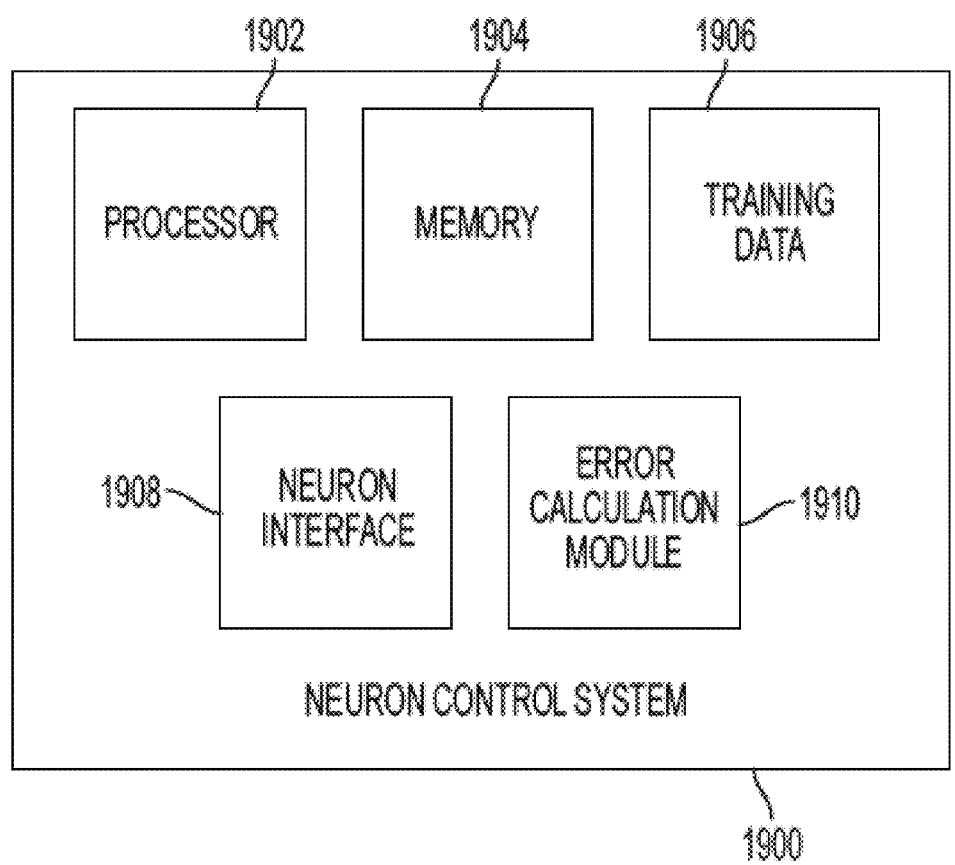
FIG. 19 depicts a block diagram of a node control system in accordance with one or more embodiments.

Referring now to FIG. 19, a node/neuron control system 1900 is shown. The neuron control system 1900 includes a hardware processor 1902 and memory 1904. Training data 1906 for a CNN is stored in the memory 1906 and is used to train weights of the CNN. A neuron interface 1908 controls neurons on the CNN, determining whether the neurons are in feed forward mode, back propagation mode, or weight update mode. The neuron interface 1908 furthermore provides inputs to input neurons and receives the output from output neurons. An error calculation module 1910 compares the outputs from the neurons to training data 1906 to determine an error signal. Neuron interface 1908 applies the error signal to the output neurons during a back propagation mode and subsequently triggers a weight update mode to train the weights of the CNN accordingly.

Figure 20:
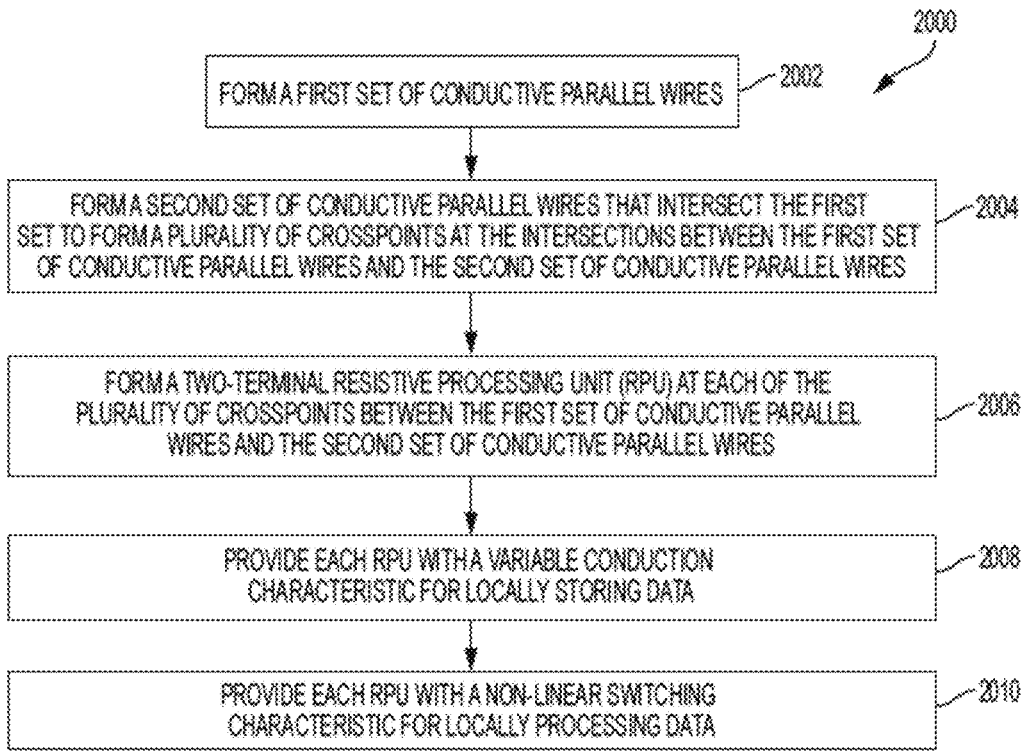
FIG. 20 depicts a flow diagram illustrating a methodology according to one or more embodiments of the present invention.

FIG. 20 depicts a flow diagram illustrating a methodology 2000 according to one or more embodiments. Methodology 2000 begins at block 2002 by forming a first set of conductive parallel wires. Block 2004 forms a second set of conductive parallel wires that intersect the first set to form a plurality of crosspoints at the intersections between the first set of conductive parallel wires and the second set of conductive parallel wires. Block 2006 forms a two-terminal RPU at each of the plurality of crosspoints between the first set of conductive parallel wires and the second set of conductive parallel wires. Block 2008 provides each RPU with a variable conduction characteristic for locally storing data, and block 2010 provides each RPU with a non-linear switching characteristic for locally processing data.

Figure 21:
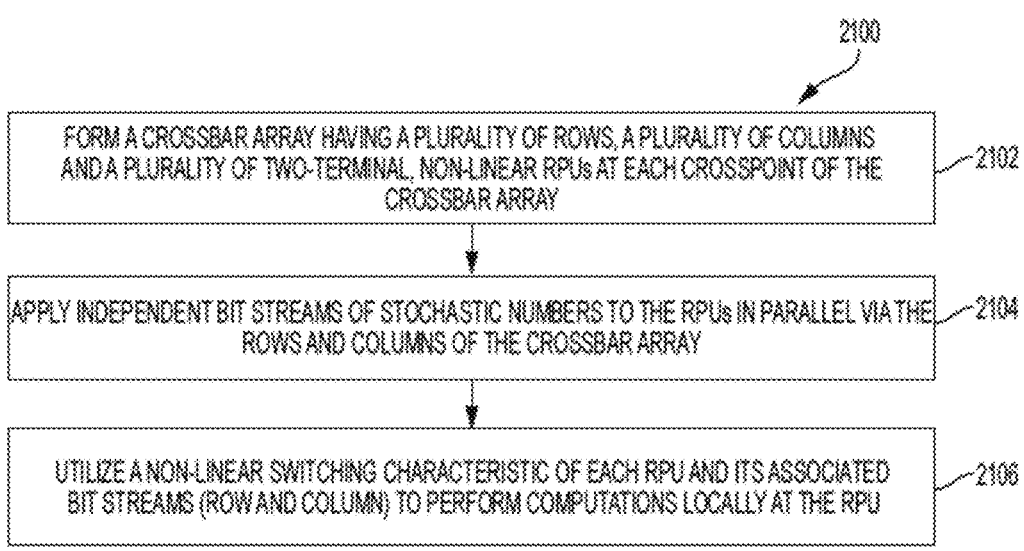
FIG. 21 depicts a flow diagram illustrating another methodology according to one or more embodiments of the present invention.

FIG. 21 depicts another flow diagram illustrating a methodology 2100 according to one or more embodiments. Methodology 2100 begins at block 2102 by forming a crossbar array having a plurality of rows, a plurality of columns and a plurality of two-terminal, non-linear RPUs at each crosspoint of the crossbar array. Block 2104 applies independent bit streams of stochastic numbers to the RPUs in parallel via the rows and columns of the crossbar array. Block 2106 utilizes a non-linear switching characteristic of each RPU and its associated bit streams (row and column) to perform computations locally at the RPU.

FIG. 22 illustrates an example of CNN, in which the input maps 510 are 4×4 matrices, the convolution kernels 520 are 2×2 matrices and the output maps 530 are 3×3 matrices. Comparing to the generic CNN diagram of FIG. 5, here n=4 and k=2, resulting in the output maps of dimension n-k+1=4-2+1=3. FIG. 22 further illustrates an expanded computation for each element $o_i$ of the output map 530, which is based on convolution operation using the input maps 510 and convolution kernels 520.

Figure 23:
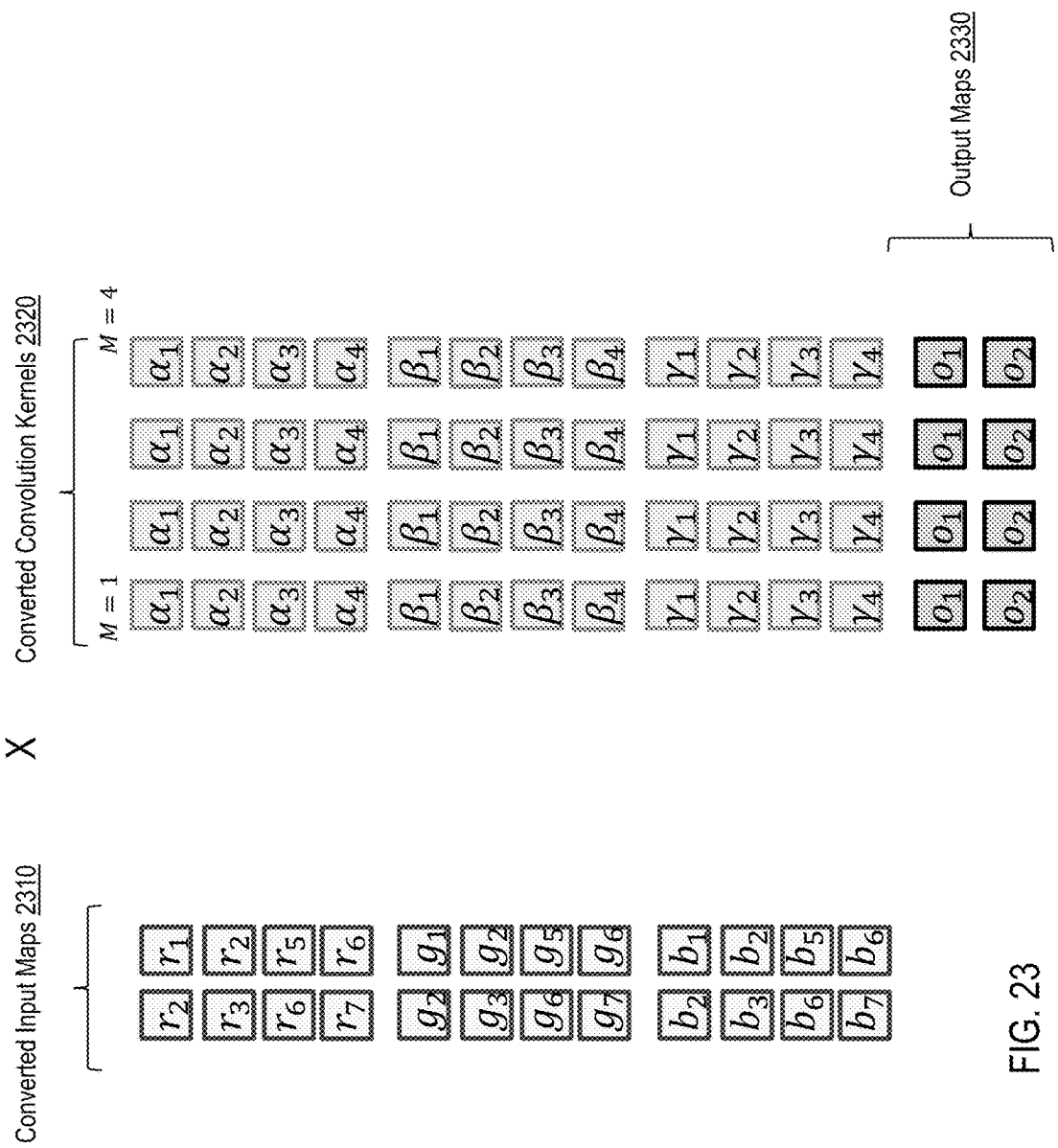
FIG. 23 illustrates how expanded computations for the CNN of FIG. 22 can be expressed as matrix multiplications.

FIG. 23 illustrates how the expanded computations can be expressed as matrix multiplications. The input maps 510 are expressed as converted input maps 2310 by expanding subsets of the input maps 510 as column vectors. Similarly, the convolution kernels 520 are expressed as column vectors by converted convolution kernels 2320. The converted convolution kernels 2320 can be viewed as a matrix with dimensions $M \times k^2 n$.

Figure 24:
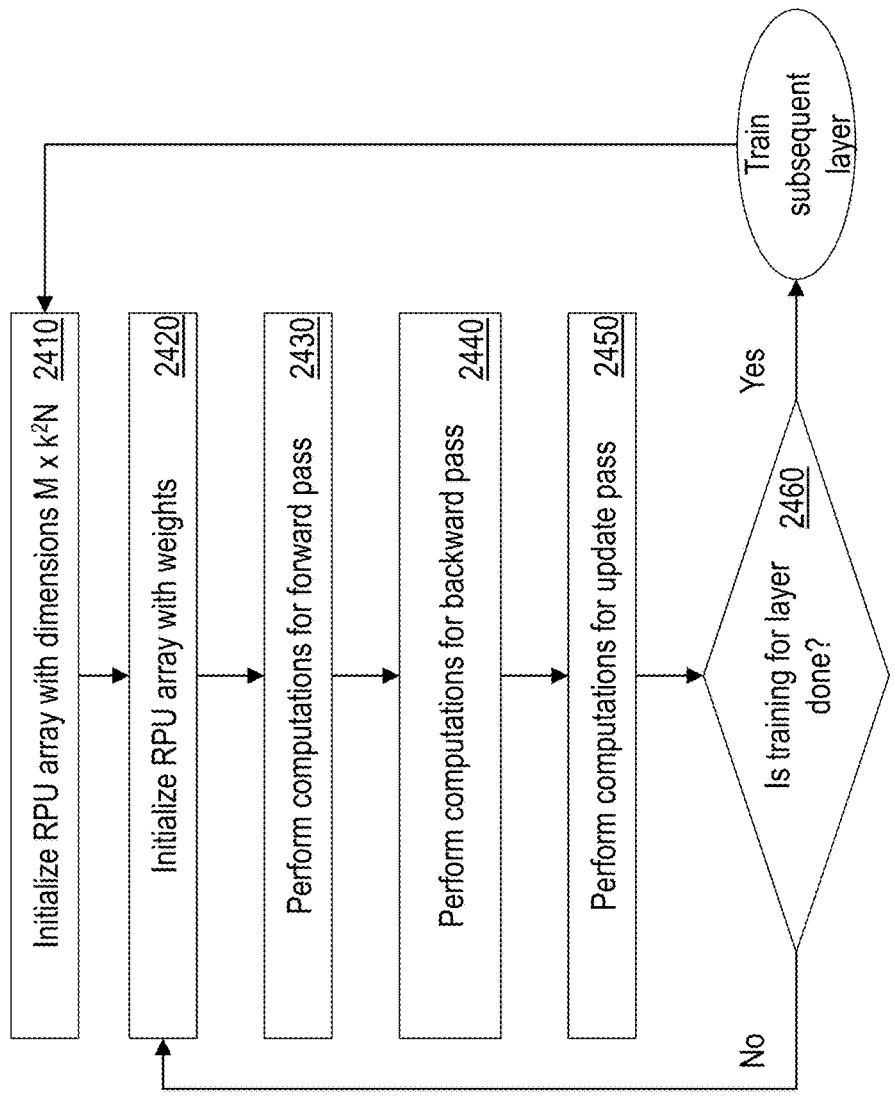
FIG. 24 illustrates a flowchart of an example method for using an RPU array for training one layer of a CNN according to one or more embodiments.

Referring back to the neuron control system 1900 and the RPU array 800, the neuron control system 1900 uses the RPU array 800 to perform the operations of the CNN training using the converted input maps 2310, the converted convolution kernels 2320, and the converted output maps 2330. FIG. 24 illustrates a flowchart of an example method for using the RPU array 800 for training one layer of a CNN. The neuron control system 1900 can implement the method, for example using the processor 1910. In one or more examples, the neuron control system 1900 trains multiple RPU arrays, each RPU array for a corresponding CNN layer.

Alternatively or in addition, the neuron control system 1900 uses a single RPU array for training multiple layers of the CNN.

As shown in FIG. 24, the method includes initializing the RPU array 800 according to the dimensions of the parameters associated with the CNN layer being trained, as shown at block 2410. In one or more embodiments, the RPU array 800 is initialized to M×$k^2$N dimensions, where M is the number of convolution kernels, k is the dimension of the convolution kernel, and N is the number of input maps. The neuron control system 1900 by setting the RPU array 800 accordingly selects a number of weights being trained for the CNN layer, each weight being a crosspoint device, such as the RPU device 820. As described earlier, the RPU array 820 is configured to represent the converted convolution kernels 2320, which are matrices that include column vectors of the convolution kernels 520.

The method can further include initializing the values of the weights in the RPU array 800, as shown at block 2420. Changing values of the weights in the RPU array 800 includes changing the conductance of the corresponding RPU devices in the RPU array 800, which can be done in parallel for all the RPU devices on the RPU array 800 as described herein. For example, the values of the weights in the RPU array 800 are set to the initial values of the convolution kernels 520 after converting to the column vector format as described earlier.

Figure 25:
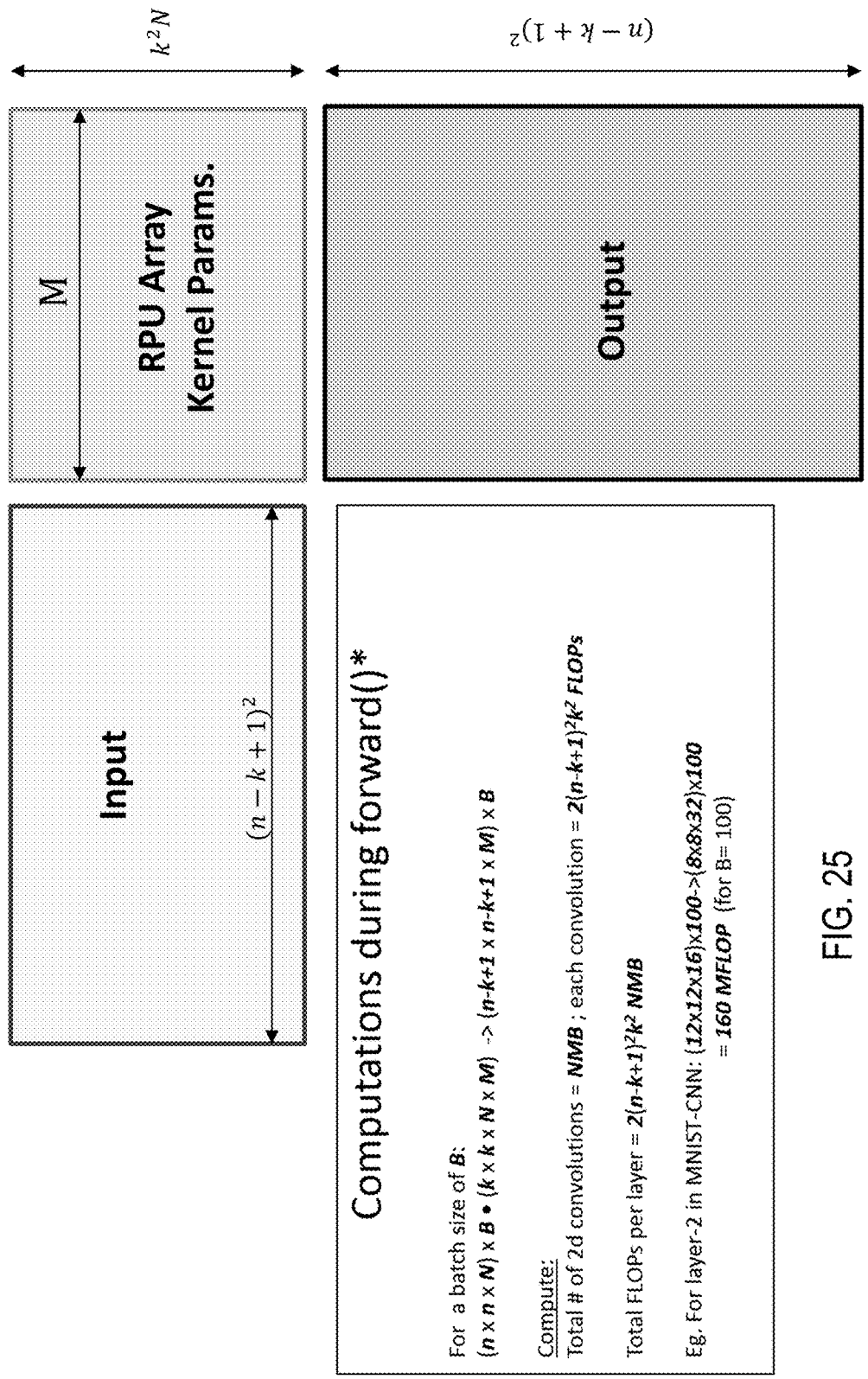
FIG. 25 illustrates computations that are performed during forward pass of training a CNN layer using an RPU array according to one or more embodiments.

The method further includes performing the computations for the forward pass, as shown at block 2430. FIG. 25 illustrates the computations that are performed for the forward pass. During feed-forward operation, the set of input neurons (see FIG. 18) each provide an input voltage in parallel to a respective row of RPU devices, which represent the weights of the convolution kernels. The input voltage correspond to the values in the input data 510, which are converted into column vectors 2310. The RPU devices each have a settable resistance value, such that a current output flows from the RPU device 820 to a respective hidden neuron to represent the weighted input. The current output by a RPU device is determined as I=v/r, where V is the input voltage from the input neuron and r is the set resistance of the RPU device. The current from each RPU device adds column-wise and flows to a hidden neuron. A set of reference weights have a fixed resistance and combine their outputs into a reference current that is provided to each of the hidden neurons. Because conductance values can only be positive numbers, some reference conductance is needed to encode both positive and negative values in the matrix. The currents produced by the RPU devices are continuously valued and positive, and therefore the reference weights are used to provide a reference current, above which currents are considered to have positive values and below which currents are considered to have negative values.

The hidden neurons use the currents from the array of RPU devices and the reference weights to read the result of the vector matrix multiplication operation. The hidden neurons then output a voltage of their own to another array of RPU devices. This array performs in the same way, with a column of RPU devices receiving a voltage from their respective hidden neuron to produce a weighted current output that adds row-wise and is provided to the output neuron. It should be understood that any number of these stages can be implemented, by interposing additional layers of arrays and hidden neurons.

The total number of floating point operations (FLOPs) performed for each layer in the forward pass is $2(n-k+1)^2k^2 \times N \times M \times B$, because each convolution requires $2(n-k+1)^2k^2$ FLOPs and each convolution layer requires N×M×B convolutions, where, n=dimension of input map, k=dimension of convolution kernel, N=number of input maps in a batch, M=number of output maps, and B=number of batches. Using the RPU array 800, $2k^2 \times N \times M$ of the operations can be performed in parallel by performing a vector-matrix multiplication on the RPU array. To finish the whole computation required for the convolutional layer $(n-k+1)^2 \times B$ vectors are fed to RPU array sequentially.

For example, in the MNIST database example, for training layer-2 of a CNN in one embodiment, n=12, k=8, N=16, M=2, and B=100. Thus, for such a layer-2, the RPU array 800 performs 160 MFLOPs. It is understood that in other embodiments, the number of FLOPS can vary, for example by using a different number of batches.

Figure 26:
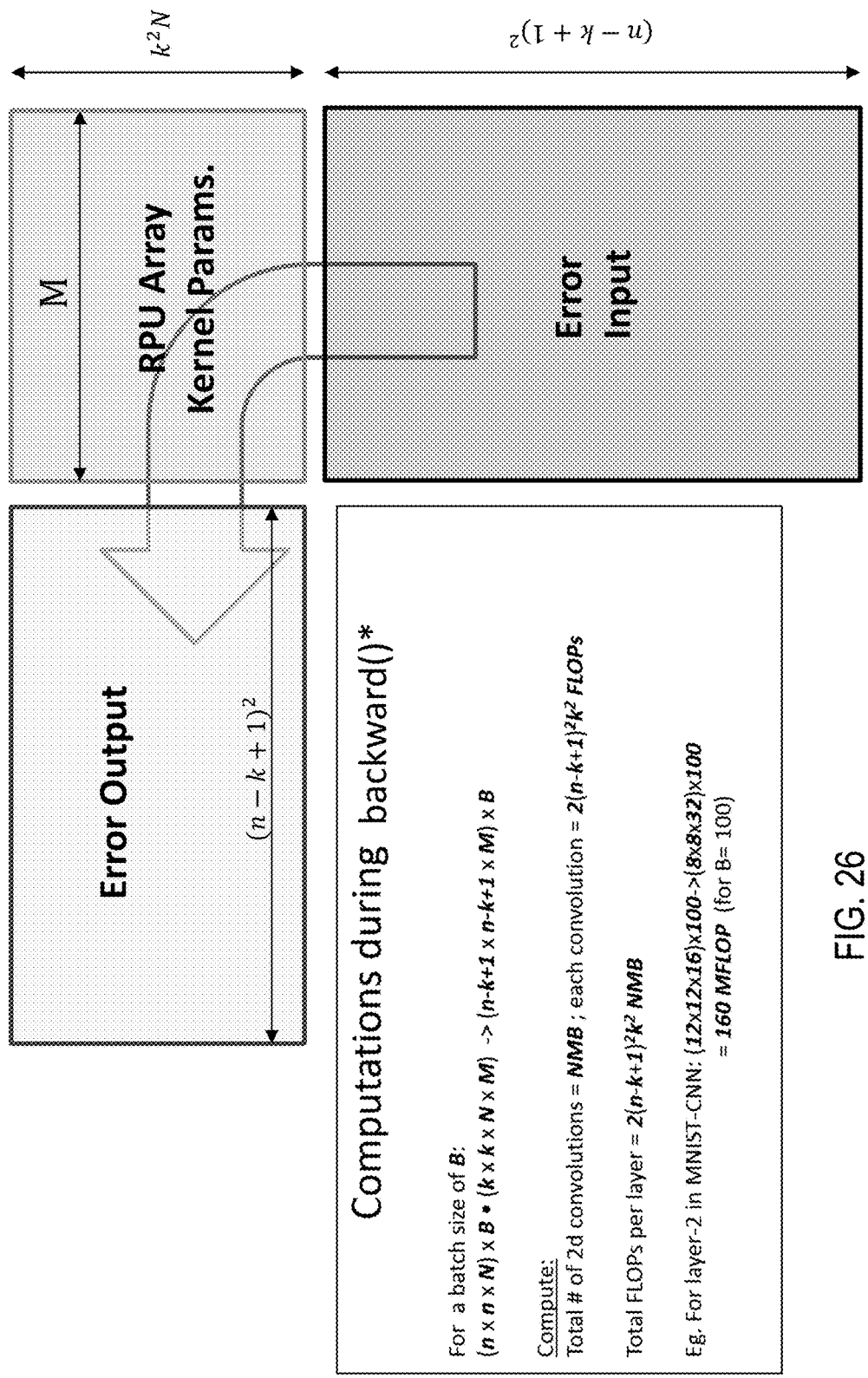
FIG. 26 illustrates computations that are performed during backward pass of training a CNN layer using an RPU array according to one or more embodiments.

Referring back to FIG. 24, the method further includes performing computations for the backward pass, as shown at block 2440. The number of computations for the backward pass are the same as those for the forward pass. The RPU array 800 facilitates performing the vector matrix multiplications for the backward pass as described herein (see FIG. 16). FIG. 26 illustrates the computations that are performed for the backward pass.

During back propagation, the output neurons provide a voltage back across the array of RPU devices. The output layer compares the generated network response to training data and computes an error. The error is applied to the RPU array 800 as a voltage pulse, where the height and/or duration of the pulse is modulated proportional to the error value. In this example, a row of RPU devices receives a voltage from a respective output neuron in parallel and converts that voltage into a current which adds column-wise to provide an input to hidden neurons. The hidden neurons combine the weighted feedback signal with a derivative of its feed-forward calculation and stores an error value before outputting a feedback signal voltage to its respective column of RPU devices. This back propagation travels through the entire RPU array until all hidden neurons and the input neurons have stored an error value.

The method further includes performing the computations for the update pass, as shown at block 2450. The update pass includes convolution operations between the input maps and the errors computed by the forward and backward passes to compute the updates for the convolution filters. During weight updates, the input neurons and the hidden neurons apply a first weight update voltage forward and the output neurons and hidden neurons apply a second weight update voltage backward through the RPU array 800. The combinations of these voltages create a state change within each RPU device 820, causing the RPU device 820 to take on a new resistance value. In this manner, the RPU device can be trained to adapt the CNN layer to errors in its processing. It should be noted that the three modes of operation, feed forward, back propagation, and weight update, do not overlap with one another.

Figure 27:
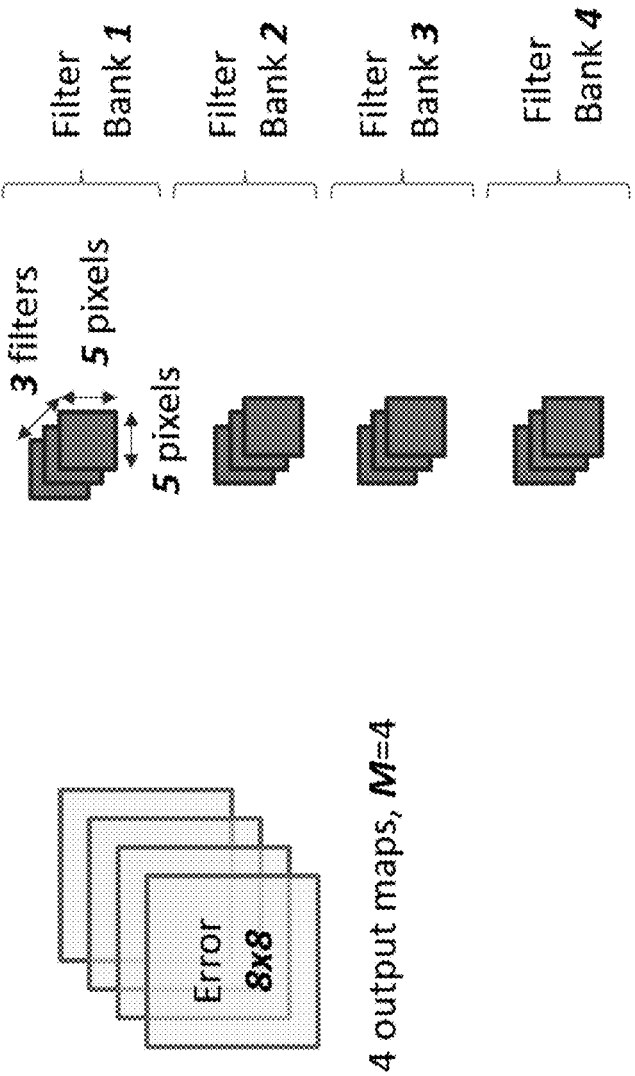
FIG. 27 illustrates update pass computations for an example CNN layer.
Figure 28:
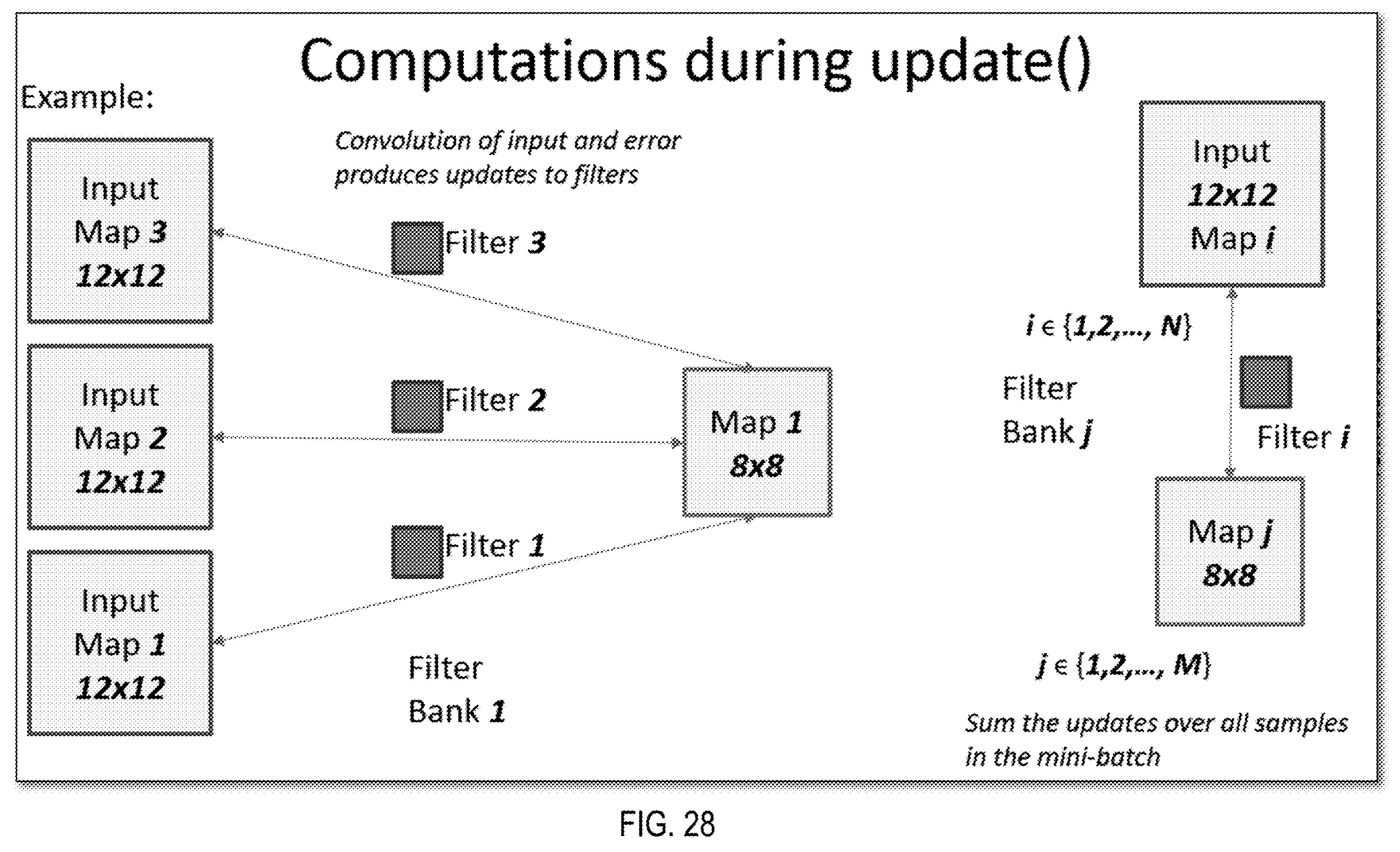

FIG. 27 illustrates the update pass computations for the layer-2 of the CNN using the MNIST database, which generates M=4 filter banks, each including N=3 filters, of dimension n−k+1=5. FIG. 28 further illustrates the computations for the update pass. As illustrated, the update values determined by the convolution operations in each batch are summed across all the batches to compute the updated convolution filters.

Figure 29:
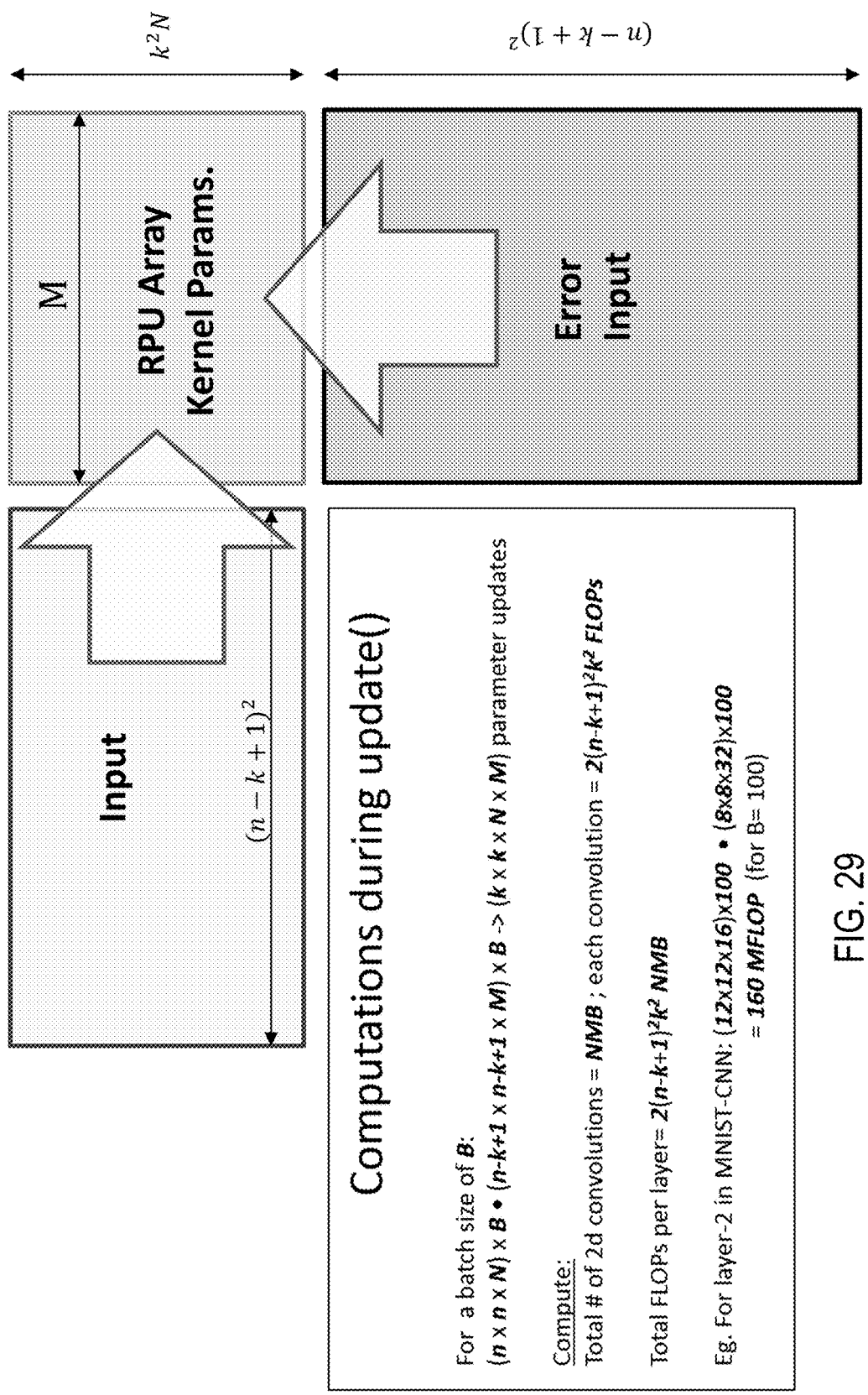
FIG. 29 illustrates computations that are performed during update pass of training a CNN layer using an RPU array according to one or more embodiments.

FIG. 29 illustrates the computations performed using the RPU array 800, where the input maps 2310 and the error inputs generated during the backward pass computations (see FIG. 26) are input to the RPU array 800 resulting in updated weights being stored at the RPU devices in the RPU array.

Thus, an RPU array 800 implements a convolution layer from the CNN. The RPU array 800 can forward processed data to another RPU array, which implements a subsequent convolution layer in the CNN. Accordingly, in one or more embodiments, the neuron control system 1900 implements a CNN that includes multiple CNN layers by using multiple RPU arrays, one RPU for each CNN layer.

The RPU array 800, such as of size 4096×4096, typically requires 80 nanoseconds to perform the forward pass (or backward pass) computations in parallel, where the computations include multiplication. Accordingly, the throughput of the RPU array 800 for performing the computations can be determined as follows.

$$\text{Throughput} = \frac{2 \times k^2 N \times M}{80 \text{ ns}}$$

As illustrated in FIG. 25 and FIG. 26, the dimensions of the RPU array 800 are selected as M×k²N. Thus, the throughput for the forward and backward pass can be expressed as follows.

$$\text{Throughput} = \frac{2 \times \text{Array\_Size}}{80 \text{ ns}}$$

For example, for a convolution layer with dimensions 200×200, the throughput is 1 TeraOps/s for performing the convolution operations that are converted into matrix multiplications as described herein. It is to be noted that the throughput can change according to the size of the RPU array 800, as well as the implementation of the RPU devices in the RPU array.

For the computations for the update cycle, where the weights are updated by summing across all the batches, the RPU devices in the RPU array 800 can be updated in 20 nanoseconds per given vector input from the columns and the rows. Typically, the time required to update the weights is irrespective of the size of the RPU array 800. It is understood that the time required for the update can change according to the implementation of the RPU devices of the array. Using the 20 nanoseconds example, the throughput of the update pass can be computed as follows.

$$\text{Throughput} = \frac{2 \times k^2 N \times M}{20 \text{ ns}}$$
$$= \frac{2 \times \text{Array\_Size}}{20 \text{ ns}}$$

Thus, for the example scenario with 200×200 RPU array, the throughput is 4 TeraOps/s. Accordingly, by using the RPU array 800, training the CNN achieves higher throughput for larger networks, because the throughput increases with the array size, and the time required for the computations in parallel is typically a constant associated with the RPU array 800. Thus, more the RPU units used, higher the throughput.

Figure 30:
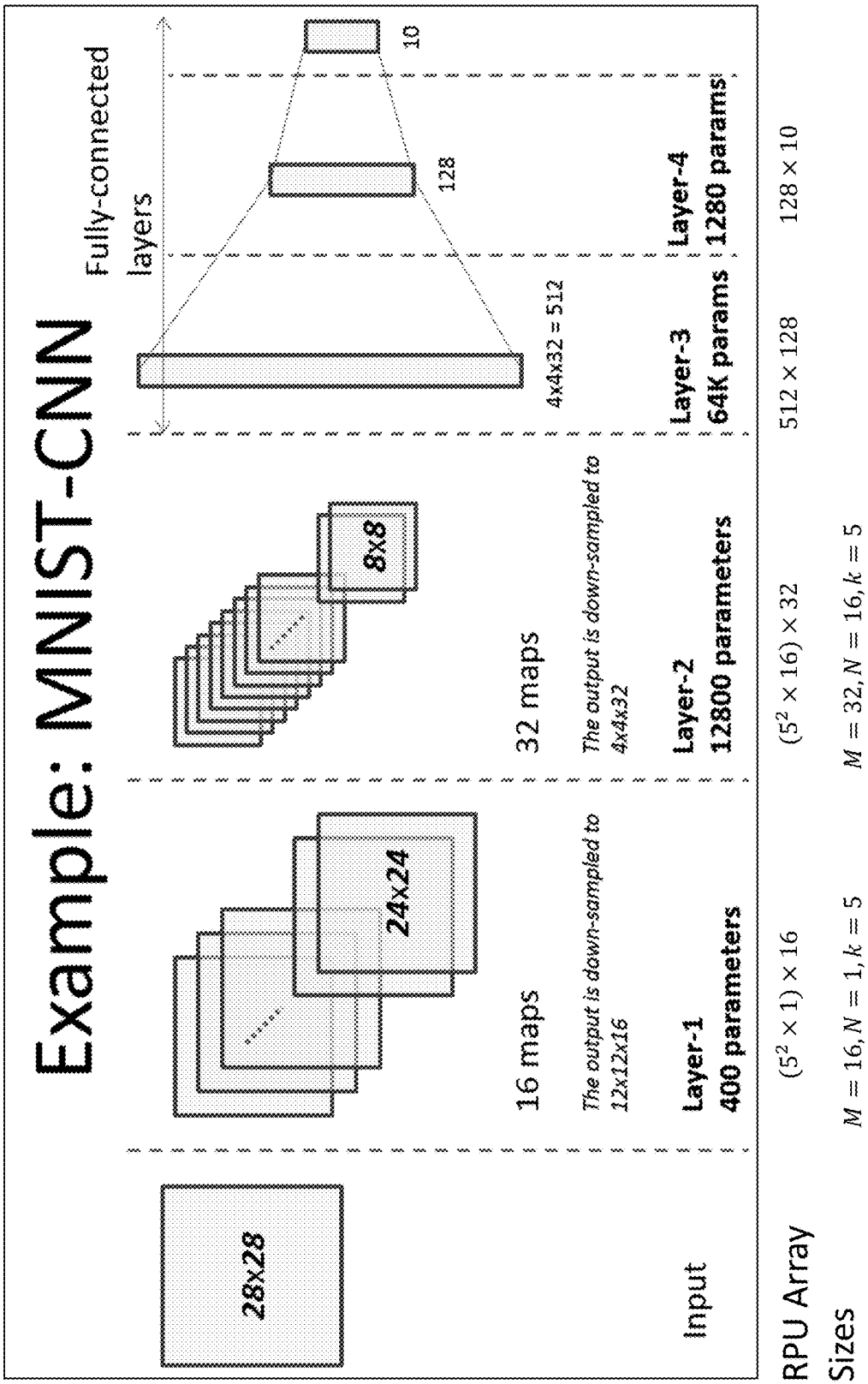
FIG. 30 illustrates the example scenario of training a CNN using the MNIST database using 2 convolution layers and 2 fully connected layers.

FIG. 30 illustrates the example scenario of training a CNN using the MNIST database using 4 convolution layers, in which the layers 3 and 4 are fully-connected layers, and layer 1 and 2 are convolution layers. As described herein, a first RPU array with dimensions (5²×1)×16, is used for training the convolution layer-1, because k=5, N=1, and M=16, in this case. For the layer-2, where k=5, N=16, and M=32, a second RPU array is configured for the training with dimensions (5²×16)×32. The weights from the first RPU array can be passed to the second RPU array for training the layer-2. In addition, the layer-3 and the layer-4 are trained using a third and a fourth RPU array respectively, as described herein (See FIG. 16).

Figure 31:
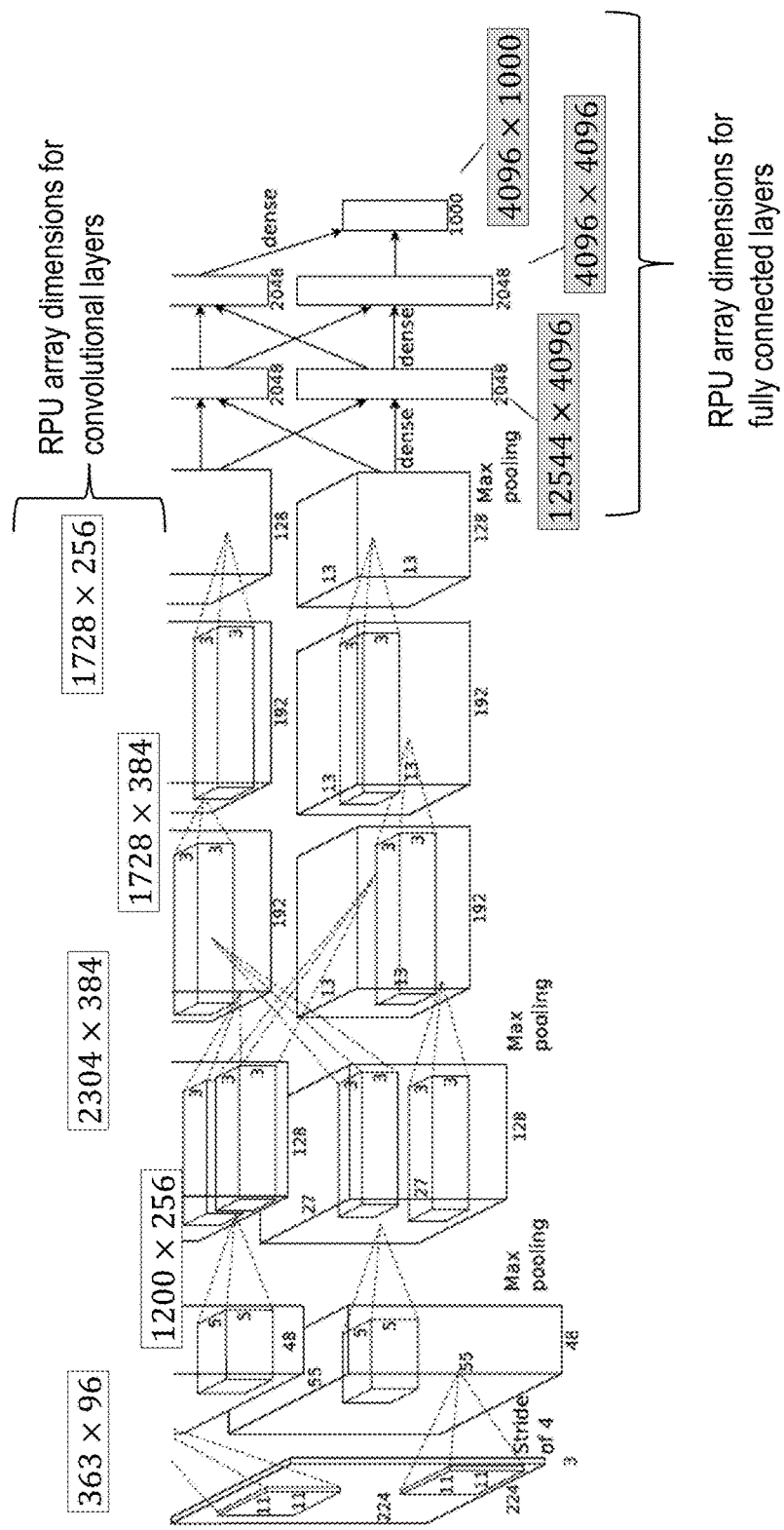
FIG. 31 illustrates an example scenario of training a CNN for classifying images using 5 convolution layers and 3 fully connected layers.

FIG. 31 illustrates an example scenario of training a CNN for classifying 1.2 million high-resolution images into 1000 different classes. The neural network includes five convolutional layers, some of which are followed by max-pooling layers, and three fully-connected layers with a final 1000-way softmax. The first convolutional layer filters input images of dimensions 224×224×3 with 96 kernels of size 11×11×3 with a stride of 4 pixels (this is the distance between the receptive field centers of neighboring neurons in a kernel map). That is N=3, n=224, k=11, M=96 for the first layer, resulting in an RPU array of dimensions 363×96.

The second convolutional layer takes as input the (response-normalized and pooled) output of the first convolutional layer and filters it with 256 kernels of size 5×5×48. That is, for the second layer, M=256, k=5, and N=48 (because of max-pooling). Accordingly, the RPU array for the second layer is setup with dimensions 1200×256.

The third, fourth, and fifth convolutional layers are connected to one another without any intervening pooling or normalization layers. The third convolutional layer has 384 kernels of size 3×3×256 connected to the (normalized, pooled) outputs of the second convolutional layer. The fourth convolutional layer has 384 kernels of size 3×3×192, and the fifth convolutional layer has 256 kernels of size 3×3×192. The corresponding sizes of the RPU arrays for the third, fourth, and fifth convolution layers are illustrated in FIG. 31.

The convolution layers are followed by three fully connected layers, which have 4096 neurons each. Using max-pooling for the output of the fifth convolution layer, the RPU dimensions for the first fully connected layer in the CNN is setup with 256×7×7=12544 rows (because of max-pooling 13×13 drops to 7×7) and 4096 columns. The second fully connected layer uses the 4096 outputs from the first fully connected layer and has dimensions 4096×4096. The final output in this case is obtained from a 4096×1000 fully connected layer. Thus, overall the CNN has an input which is 150,528-dimensional, and the number of neurons in the network's remaining layers is given by 253,440-186,624-64,896-64,896-43,264-4096-4096-1000.

The neuron control system 1900, as described herein, trains the neural network with the convolutional and fully connected layers by setting up the RPU arrays with the dimensions as described herein. Further, the neuron control system 1900 converts each convolution layer in the CNN training into a fully connected layer, by converting the convolution computations into matrix multiplications as described above.

The training of the neural network using the embodiments described herein achieves acceleration factors that are orders of magnitude better than conventional CPU/GPU implementations.

Accordingly, the embodiments described herein facilitate implementing convolutional neural networks with resistive cross-point devices, such as RPU devices. Such use of RPU devices, for example as part of an RPU array, in parallel for CNNs facilitates achieving orders of magnitude acceleration compared to conventional CPU/GPU implementations.

The present technical solutions can be a system, a method, and/or a computer program product at any possible technical detail level of integration. The computer program product can include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be "in response to" a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group including A, B, . . . and N. In other words, the phrases mean any combination of one or more of the elements A, B, . . . or N including any one element alone or the one element in combination with one or more of the other elements which can also include, in combination, additional elements not listed.

It will also be appreciated that any module, unit, component, server, computer, terminal or device exemplified herein that executes instructions can include or otherwise have access to computer readable media such as storage media, computer storage media, or data storage devices (removable and/or non-removable) such as, for example, magnetic disks, optical disks, or tape. Computer storage media can include volatile and non-volatile, removable and non-removable media implemented in any method or technology for storage of information, such as computer readable instructions, data structures, program modules, or other data. Such computer storage media can be part of the device or accessible or connectable thereto. Any application or module herein described can be implemented using computer readable/executable instructions that can be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for implementing a convolutional neural network (CNN) using resistive processing unit (RPU) array, the method comprising:
configuring an RPU array corresponding to a convolution layer in the CNN based on convolution kernels of the convolution layer;
performing forward pass computations for the CNN via the RPU array using input data of the convolution layer, and storing resulting values corresponding to output currents from the RPU array as output maps;
performing backward pass computations for the CNN via the RPU array by:
transmitting voltage pulses corresponding to error of the output maps of the convolution layer to the RPU array; and
storing values corresponding to the output currents from the RPU arrays as backward error maps; and
performing update pass computations for the CNN via the RPU array by transmitting voltage pulses corresponding to the input data of the convolution layer and the error of the output maps to the RPU array.

2. The computer implemented method of claim 1, wherein the RPU array comprises a plurality of RPU devices.

3. The computer implemented method of claim 1, wherein an RPU device from the RPU array comprises:
a first terminal;
a second terminal; and
an active region having a conduction state;
wherein the active region is configured to locally perform a data storage operation to store weights of the CNN; and
wherein the active region is further configured to locally perform a data processing operation to update the weights of the CNN.

4. The computer implemented method of claim 3, wherein a change in the conduction state comprises a non-linear change based on at least one first encoded signal applied to a first terminal and at least one second encoded signal applied to the second terminal of the RPU device.

5. The computer implemented method of claim 1, wherein the RPU array sums currents from an entire row or column of resistive processing units to form an output current.

6. The computer implemented method of claim 1, wherein configuring the RPU array for the convolution layer comprises:
initiating the RPU to include M columns and $k^2N$ rows, wherein M is a number of convolution kernel banks, k is a number of rows in a convolution kernels, and N is a number of convolution kernels in each convolution kernel bank.

7. The computer implemented method of claim 1, further comprising:
converting the input data to column vectors based on dimensions of the convolution kernel.

8. The computer implemented method of claim 1, further comprising:
transmitting the results of the forward pass and backward pass computations from the RPU array to another RPU array that implements a subsequent convolution layer of the CNN.

9. A system facilitating training a convolution layer of a convolutional neural network (CNN) using resistive processing unit (RPU) arrays, the system comprising:
an RPU array, which comprises a plurality of RPUs; and
a processor configured to control electric voltage across the RPUs from the RPU array, wherein the processor is configured to:
configure the RPU array corresponding to the convolution layer based on dimensions associated with convolution kernels of the convolution layer;
perform forward pass computations for the CNN via the RPU array using input data of the convolution layer and storing values corresponding to output currents from the RPU array as output maps;
perform backward pass computations for the CNN via the RPU array by:
transmitting voltage pulses corresponding to error of the output maps of the convolution layer to the RPU array; and
storing values corresponding to the output currents from the RPU array as backward error maps;

perform update pass computations for the CNN via the RPU array by:
transmitting voltage pulses corresponding to the input data of the convolution layer and the error of the output maps to the RPU array; and
update weights of RPU devices of the RPU array.

10. The system of claim 9, wherein the RPU array comprises:
a set of conductive row wires;
a set of conductive column wires configured to form a plurality of crosspoints at intersections between the set of conductive row wires and the set of conductive column wires; and
a two-terminal RPU at each of the plurality of crosspoints.

11. The system of claim 10, wherein the two-terminal RPU comprises:
a first terminal;
a second terminal; and
an active region having a conduction state; and
wherein the active region is configured to effect a non-linear change in the conduction state based on at least one first encoded signal applied to the first terminal and at least one second encoded signal applied to the second terminal.

12. The system of claim 11, wherein the non-linear change comprises a rectifying non-linear change or a saturating non-linear change.

13. The system of claim 11, wherein the non-linear change comprises an exponential non-linear change.

14. The system of claim 10, wherein the RPU array sums currents from an entire row or column of resistive processing units to form an output current.

15. The system of claim 9, wherein the processor configures the RPU array for the convolution layer by initiating the RPU to include M columns and $k^2N$ rows, wherein M is a number of convolution kernel banks, k is a number of rows and columns in a convolution kernels, and N is a number of convolution kernels in each convolution kernel bank.

16. A computer program product for training a convolution layer of a convolutional neural network (CNN) using resistive processing unit (RPU) arrays, the computer program product comprising a computer readable storage medium, the computer readable storage medium comprising computer executable instructions, wherein the computer readable storage medium comprises instructions to:
configure an RPU array corresponding to the convolution layer based on dimensions associated with convolution kernels of the convolution layer;
perform forward pass computations for the CNN via the RPU array using input data of the convolution layer;
perform backward pass computations for the CNN via the RPU array by:
transmitting voltage pulses corresponding to error of output maps of forward pass computations for the CNN to the RPU array, wherein output currents from the RPU array are stored as the output maps during the forward pass computations; and
storing values corresponding to the output currents from the RPU array as backward error maps;
perform update pass computations for the CNN via the RPU array by:
transmitting voltage pulses corresponding to the input data of the convolution layer and the error of the output maps to the RPU array; and
update weights of RPU devices from the RPU array.

17. The computer program product of claim 16, wherein configuring the RPU array for the convolution layer comprises initiating the RPU to include M columns and $k^2N$ rows, wherein M is a number of convolution kernel banks, k is a number of rows and the columns in a convolution kernels, and N is a number of convolution kernels in each convolution kernel bank.

18. The computer program product of claim 16, wherein the computer readable storage medium further comprises instructions to convert the input data to column vectors based on dimensions of the convolution kernel.

19. The non-transitory computer program product of claim 16, wherein the RPU array comprises:
a set of conductive row wires;
a set of conductive column wires configured to form a plurality of crosspoints at intersections between the set of conductive row wires and the set of conductive column wires; and
a two-terminal RPU at each of the plurality of crosspoints.

20. The non-transitory computer program product of claim 19, wherein the two-terminal RPU comprises:
a first terminal;
a second terminal; and
an active region having a conduction state; and
wherein the active region is configured to effect a non-linear change in the conduction state based on at least one first encoded signal applied to the first terminal and at least one second encoded signal applied to the second terminal.

* * * * *